United States Patent
Li et al.

(10) Patent No.: US 7,565,803 B2
(45) Date of Patent: Jul. 28, 2009

(54) SWIRLER ARRANGEMENT FOR MIXER ASSEMBLY OF A GAS TURBINE ENGINE COMBUSTOR HAVING SHAPED PASSAGES

(75) Inventors: Shui-Chi Li, West Chester, OH (US); Shih-Yang Hsieh, West Chester, OH (US); George Chia-Chun Hsiao, West Chester, OH (US); Hukam Chand Mongia, West Chester, OH (US)

(73) Assignee: General Electric Company, Schnectady, NY (US)

( * ) Notice: Subject to any disclaimer, the term of this patent is extended or adjusted under 35 U.S.C. 154(b) by 698 days.

(21) Appl. No.: 11/188,595

(22) Filed: Jul. 25, 2005

(65) Prior Publication Data

US 2007/0017224 A1    Jan. 25, 2007

(51) Int. Cl.
  *F02C 1/00* (2006.01)
(52) U.S. Cl. ........................................... 60/748
(58) Field of Classification Search ........... 60/748, 60/740, 737, 738; 239/399, 400–405
See application file for complete search history.

(56) References Cited

U.S. PATENT DOCUMENTS

| | | | | |
|---|---|---|---|---|
| 4,263,780 | A * | 4/1981 | Stettler | 60/39.23 |
| 4,754,600 | A * | 7/1988 | Barbier et al. | 60/39.23 |
| 6,354,072 | B1 | 3/2002 | Hura | |
| 6,363,726 | B1 | 4/2002 | Durbin et al. | |
| 6,367,262 | B1 | 4/2002 | Mongia et al. | |
| 6,381,964 | B1 | 5/2002 | Pritchard, Jr. et al. | |
| 6,418,726 | B1 | 7/2002 | Foust et al. | |
| 6,453,660 | B1 | 9/2002 | Johnson et al. | |
| 6,484,489 | B1 | 11/2002 | Foust et al. | |
| 6,865,889 | B2 | 3/2005 | Mancini et al. | |
| 6,898,938 | B2 * | 5/2005 | Mancini et al. | 60/748 |

\* cited by examiner

*Primary Examiner*—Michael Cuff
*Assistant Examiner*—Andrew Nguyen
(74) *Attorney, Agent, or Firm*—William Scott Andes; James P. Davidson

(57) ABSTRACT

A swirler arrangement for a mixing assembly of a gas turbine engine combustor, where the swirler arrangement has a centerline axis therethrough, including: a swirler housing including an outer radial wall and an upstream wall; a first plurality of vanes incorporated into the outer radial wall, wherein the first plurality of vanes are oriented at a first angle with respect to an axis through the outer radial wall; and, a second plurality of vanes incorporated into the outer radial wall, wherein the second plurality of vanes are oriented at a second angle with respect to the through the outer radial wall. A first type of passage is defined between adjacent first and second vanes having a first configuration and a second type of passage is defined between adjacent first and second vanes having a second configuration so that air flowing through the swirler arrangement is swirled in a desirable manner. The axis through the outer radial wall may be oriented either substantially radially to the centerline axis or at an acute angle to the centerline axis.

27 Claims, 22 Drawing Sheets

SWIRLER ARRANGEMENT FOR MIXER ASSEMBLY OF A GAS TURBINE ENGINE COMBUSTOR HAVING SHAPED PASSAGES

BACKGROUND OF THE INVENTION

The present invention relates to a staged combustion system in which the production of undesirable combustion product components is minimized over the engine operating regime and, more particularly, to a swirler arrangement for the main mixer of such system which enhances mixing of fuel and air.

Air pollution concerns worldwide have led to stricter emissions standards both domestically and internationally. Aircraft are governed by both Environmental Protection Agency (EPA) and International Civil Aviation Organization (ICAO) standards. These standards regulate the emission of oxides of nitrogen (NOx), unburned hydrocarbons (HC), and carbon monoxide (CO) from aircraft in the vicinity of airports, where they contribute to urban photochemical smog problems. Such standards are driving the design of gas turbine engine combustors, which also must be able to accommodate the desire for efficient, low cost operation and reduced fuel consumption. In addition, the engine output must be maintained or even increased.

It will be appreciated that engine emissions generally fall into two classes: those formed because of high flame temperatures (NOx) and those formed because of low flame temperatures which do not allow the fuel-air reaction to proceed to completion (HC and CO). Balancing the operation of a combustor to allow efficient thermal operation of the engine, while simultaneously minimizing the production of undesirable combustion products, is difficult to achieve. In that regard, operating at low combustion temperatures to lower the emissions of NOx can also result in incomplete or partially incomplete combustion, which can lead to the production of excessive amounts of HC and CO, as well as lower power output and lower thermal efficiency. High combustion temperature, on the other hand, improves thermal efficiency and lowers the amount of HC and CO, but oftentimes results in a higher output of NOx.

One way of minimizing the emission of undesirable gas turbine engine combustion products has been through staged combustion. In such an arrangement, the combustor is provided with a first stage burner for low speed and low power conditions so the character of the combustion products is more closely controlled. A combination of first and second stage burners is provided for higher power output conditions, which attempts to maintain the combustion products within the emissions limits.

Another way that has been proposed to minimize the production of such undesirable combustion product components is to provide for more effective intermixing of the injected fuel and the combustion air. In this way, burning occurs uniformly over the entire mixture and reduces the level of HC and CO that results from incomplete combustion. While numerous mixer designs have been proposed over the years to improve the mixing of the fuel and air, improvement in the levels of undesirable NOx formed under high power conditions (i.e., when the flame temperatures are high) is still desired.

One mixer design that has been utilized is known as a twin annular premixing swirler (TAPS), which is disclosed in the following U.S. Pat. Nos. 6,354,072; 6,363,726; 6,367,262; 6,381,964; 6,389,815; 6,418,726; 6,453,660; 6,484,489; and, 6,865,889. Published U.S. patent application 2002/0178732 also depicts certain embodiments of the TAPS mixer. It will be understood that the TAPS mixer assembly includes a pilot mixer which is supplied with fuel during the entire engine operating cycle and a main mixer which is supplied with fuel only during increased power conditions of the engine operating cycle. Because improvements in NOx emissions during high power conditions are of current primary concern, modification of the main mixer in the assembly is needed to maximize fuel-air mixing therein. As shown in the '964 and '815 patents, the swirler assembly includes either one or two radial swirlers. The '732 patent application, as well as U.S. Pat. No. 6,418,726, discloses a swirler assembly including an axial swirler and at least one conical swirler (oriented at an acute angle to the centerline axis). The '732 patent application discloses a swirler assembly including an axial swirler and at least one cyclonic swirler (oriented radially to a centerline axis).

While the present invention is applicable to any swirler arrangement, it will be seen that it has been disclosed as an alternative configuration in the embodiments of a mixing assembly shown and described in a patent application entitle, "Mixer Assembly For Combustor Of A Gas Turbine Engine Having A Plurality Of Counter-rotating Swirlers." This application is filed concurrently herewith, has Ser. No. 11/188,596, and is owned by the assignee of the present invention.

Accordingly, there is a desire for a gas turbine engine combustor in which the production of undesirable combustion product components is minimized over a wide range of engine operating conditions. More specifically, a mixer assembly for such gas turbine engine combustor is desired which provides increased mixing of fuel and air so as to create a more uniform mixture.

BRIEF SUMMARY OF THE INVENTION

In a first embodiment of the invention, a swirler arrangement for a mixing assembly of a gas turbine engine combustor, where the swirler arrangement has a centerline axis therethrough, is disclosed as including: a swirler housing including an outer radial wall and an upstream wall; a first plurality of vanes incorporated into the outer radial wall, wherein the first plurality of vanes are oriented at a first angle with respect to an axis through the outer radial wall; and, a second plurality of vanes incorporated into the outer radial wall, wherein the second plurality of vanes are oriented at a second angle with respect to the through the outer radial wall. A first type of passage is defined between adjacent first and second vanes having a first configuration and a second type of passage is defined between adjacent first and second vanes having a second configuration so that air flowing through the swirler arrangement is swirled in a desirable manner. The axis through the swirler arrangement may be oriented either substantially radially to the centerline axis or at an acute angle to the centerline axis.

In a second embodiment of the invention, a swirler arrangement for a mixing assembly of a gas turbine engine combustor, where the swirler arrangement has a centerline axis therethrough, is disclosed as including a swirler housing including an outer radial wall and an upstream wall; a first plurality of vanes incorporated into the upstream wall, wherein the first plurality of vanes are oriented at a first angle with respect to an axis through the upstream wall; and, a second plurality of vanes incorporated into the upstream wall, wherein the second plurality of vanes are oriented at a second angle with respect to the through the upstream wall. A first type of passage is defined between adjacent first and second vanes of the upstream wall having a first configuration and a second type of passage is defined between adjacent first and second vanes of the upstream wall having a second configuration so that air flowing through the swirler arrangement is swirled in a desirable manner.

In a third embodiment of the invention, a mixer assembly for use in a combustor of a gas turbine engine is disclosed as including a pilot mixer, a main mixer and a fuel manifold positioned between the pilot mixer and the main mixer. The pilot mixer includes an annular pilot housing having a hollow interior and a pilot fuel nozzle mounted in the housing and adapted for dispensing droplets of fuel to the hollow interior of the pilot housing. The main mixer includes a main housing surrounding the pilot housing and defining an annular cavity, a plurality of fuel injection ports for introducing fuel into the cavity, and a swirler arrangement including at least one swirler positioned upstream from the fuel injection ports. One of the swirlers further includes: a first plurality of vanes oriented at a first angle with respect to an axis therethrough; and, a second plurality of vanes oriented at a second angle with respect to the axis, wherein a first type of passage is defined between adjacent first and second vanes having a first configuration and a second type of passage is defined between adjacent first and second vanes having a second configuration. In this way, air traveling through the swirler mixes air and the droplets of fuel dispensed by the fuel injection portions in a designated manner.

DETAILED DESCRIPTION OF THE INVENTION

Figure 1:
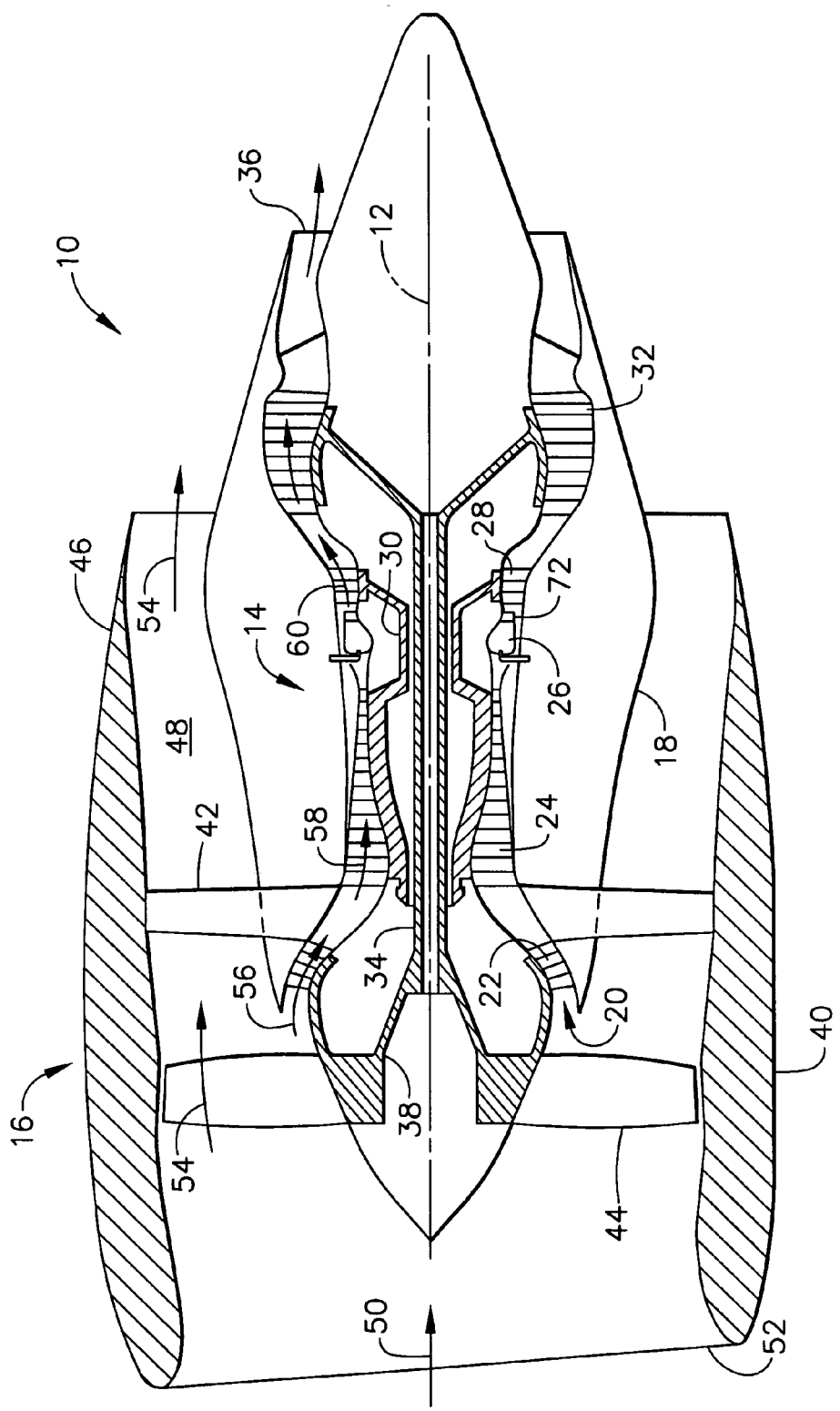
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft 30, and then to a second (low pressure) turbine 32 for driving booster compressor 22 and fan section 16 through a second (low pressure) drive shaft 34 that is coaxial with first drive shaft 30. After driving each of turbines 28 and 32, the combustion products leave core engine 14 through an exhaust nozzle 36 to provide propulsive jet thrust.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional propulsive jet thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster compressor 22.

The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide thrust for gas turbine engine 10.

Figure 2:
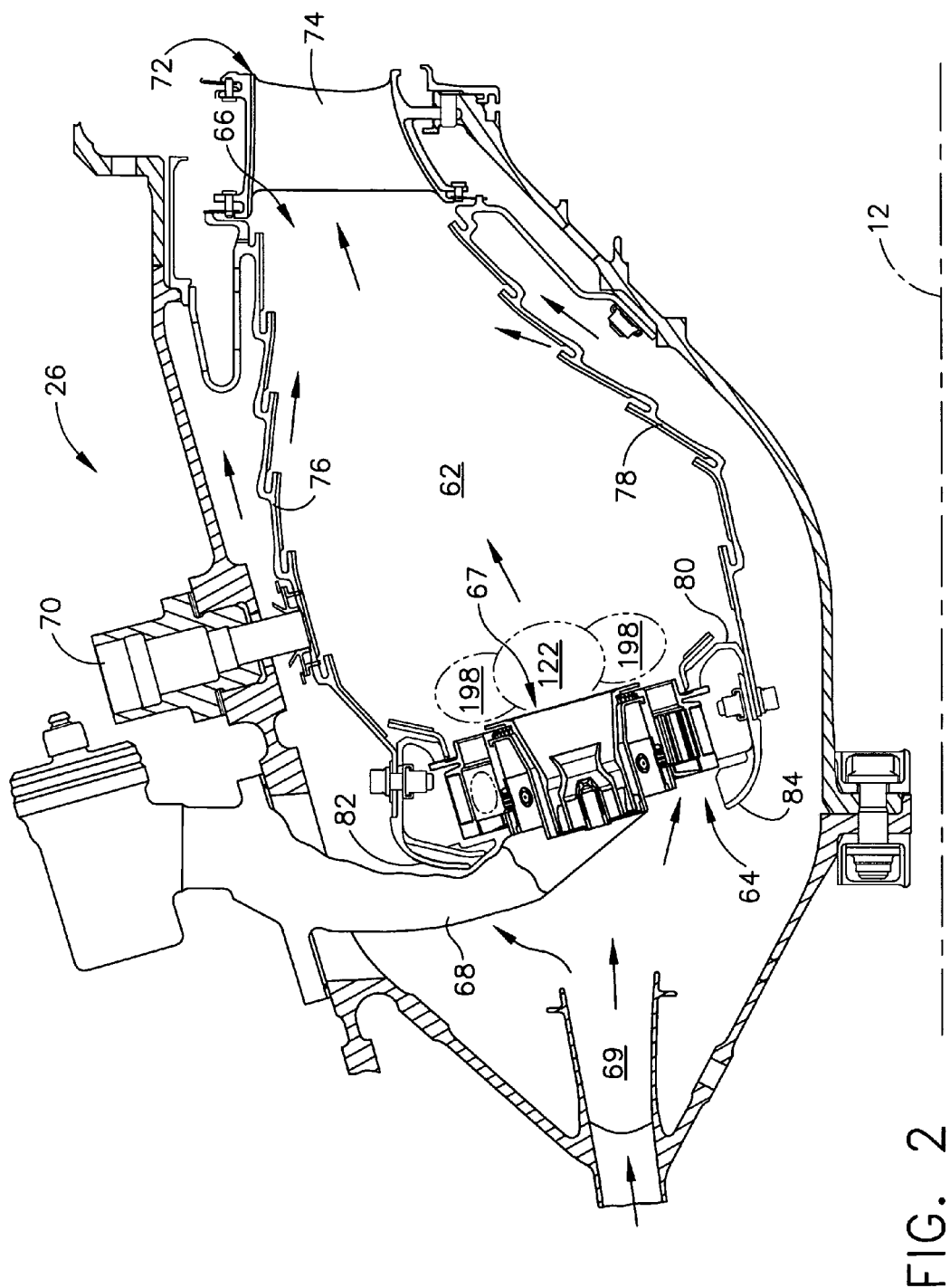
FIG. 2 is a longitudinal, cross-sectional view of a gas turbine engine combustor having a staged arrangement.

As best seen in FIG. 2, combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixing assembly 67, where fuel is also injected from a fuel nozzle 68 to mix with the air and form a fuel-air mixture that is provided to combustion chamber 62 for combustion. Ignition of the fuel-air mixture is accomplished by a suitable igniter 70, and the resulting combustion gases 60 flow in an axial direction toward and into an annular, first stage turbine nozzle 72. Nozzle 72 is defined by an annular flow channel that includes a plurality of radially-extending, circularly-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster compressor 24 and fan rotor 38 via second drive shaft 34.

Combustion chamber 62 is housed within engine outer casing 18 and is defined by an annular combustor outer liner 76 and a radially-inwardly positioned annular combustor inner liner 78. The arrows in FIG. 2 show the directions in which compressor discharge air flows within combustor 26. As shown, part of the air flows over the outermost surface of outer liner 76, part flows into combustion chamber 62, and part flows over the innermost surface of inner liner 78.

Contrary to previous designs, it is preferred that outer and inner liners 76 and 78, respectively, not be provided with a plurality of dilution openings to allow additional air to enter combustion chamber 62 for completion of the combustion process before the combustion products enter turbine nozzle 72. This is in accordance with a patent application entitled "High Pressure Gas Turbine Engine Having Reduced Emissions," filed concurrently herewith and hereby incorporated by reference, which is also owned by the assignee of the present invention. It will be understood, however, that outer liner 76 and inner liner 78 preferably include a plurality of smaller, circularly-spaced cooling air apertures (not shown) for allowing some of the air that flows along the outermost surfaces thereof to flow into the interior of combustion chamber 62. Those inwardly-directed air flows pass along the inner surfaces of outer and inner liners 76 and 78 that face the interior of combustion chamber 62 so that a film of cooling air is provided therealong.

It will be understood that a plurality of axially-extending mixing assemblies 67 are disposed in a circular array at the upstream end of combustor 26 and extend into inlet 64 of annular combustion chamber 62. It will be seen that an annular dome plate 80 extends inwardly and forwardly to define an upstream end of combustion chamber 62 and has a plurality of circumferentially spaced openings formed therein for receiving mixing assemblies 67. For their part, upstream portions of each of inner and outer liners 76 and 78, respectively, are spaced from each other in a radial direction and define an outer cowl 82 and an inner cowl 84. The spacing between the forwardmost ends of outer and inner cowls 82 and 84 defines combustion chamber inlet 64 to provide an opening to allow compressor discharge air to enter combustion chamber 62.

Figure 3:
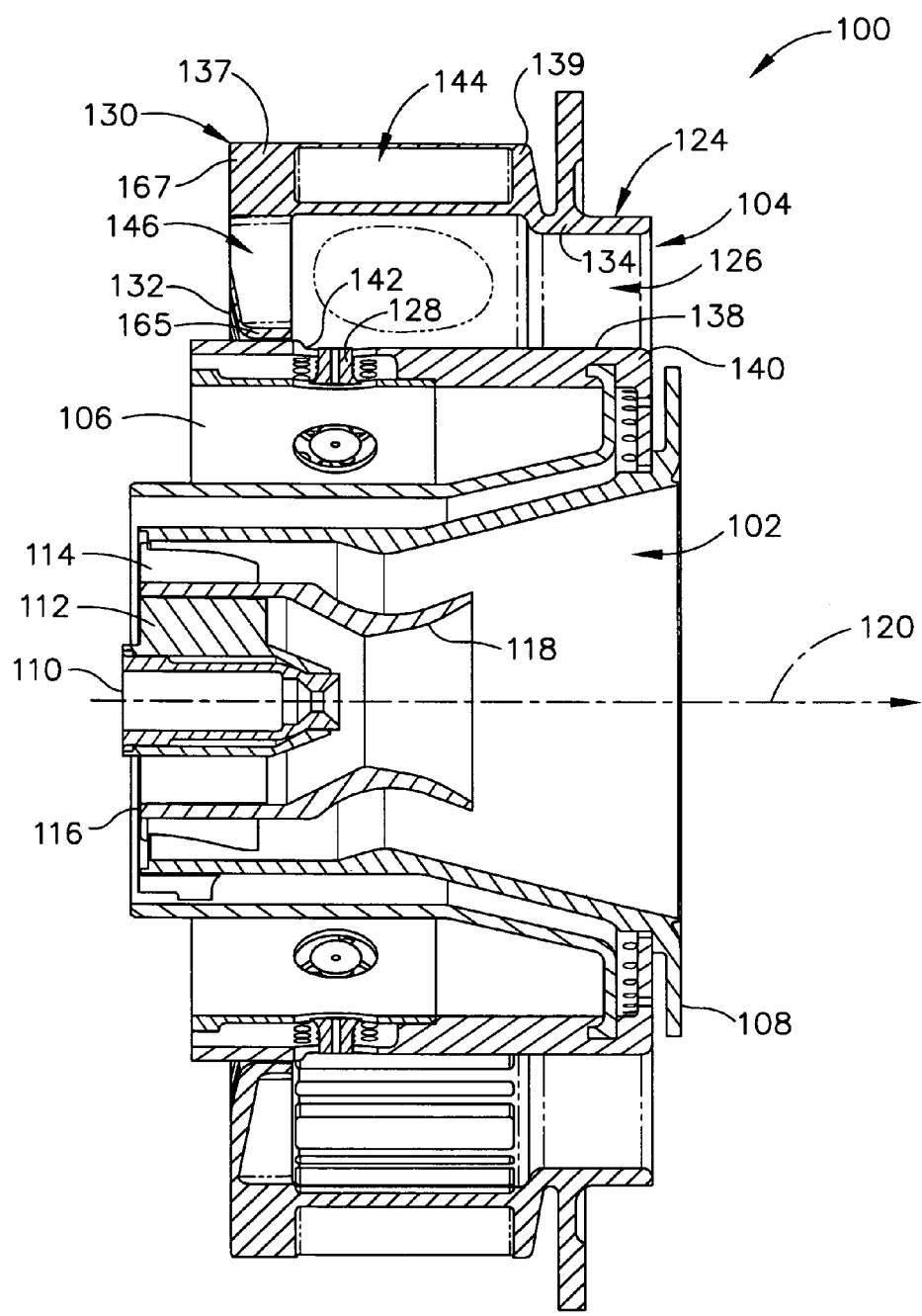
FIG. 3 is an enlarged, cross-sectional view of the mixer assembly depicted in FIG. 2.
Figure 4:
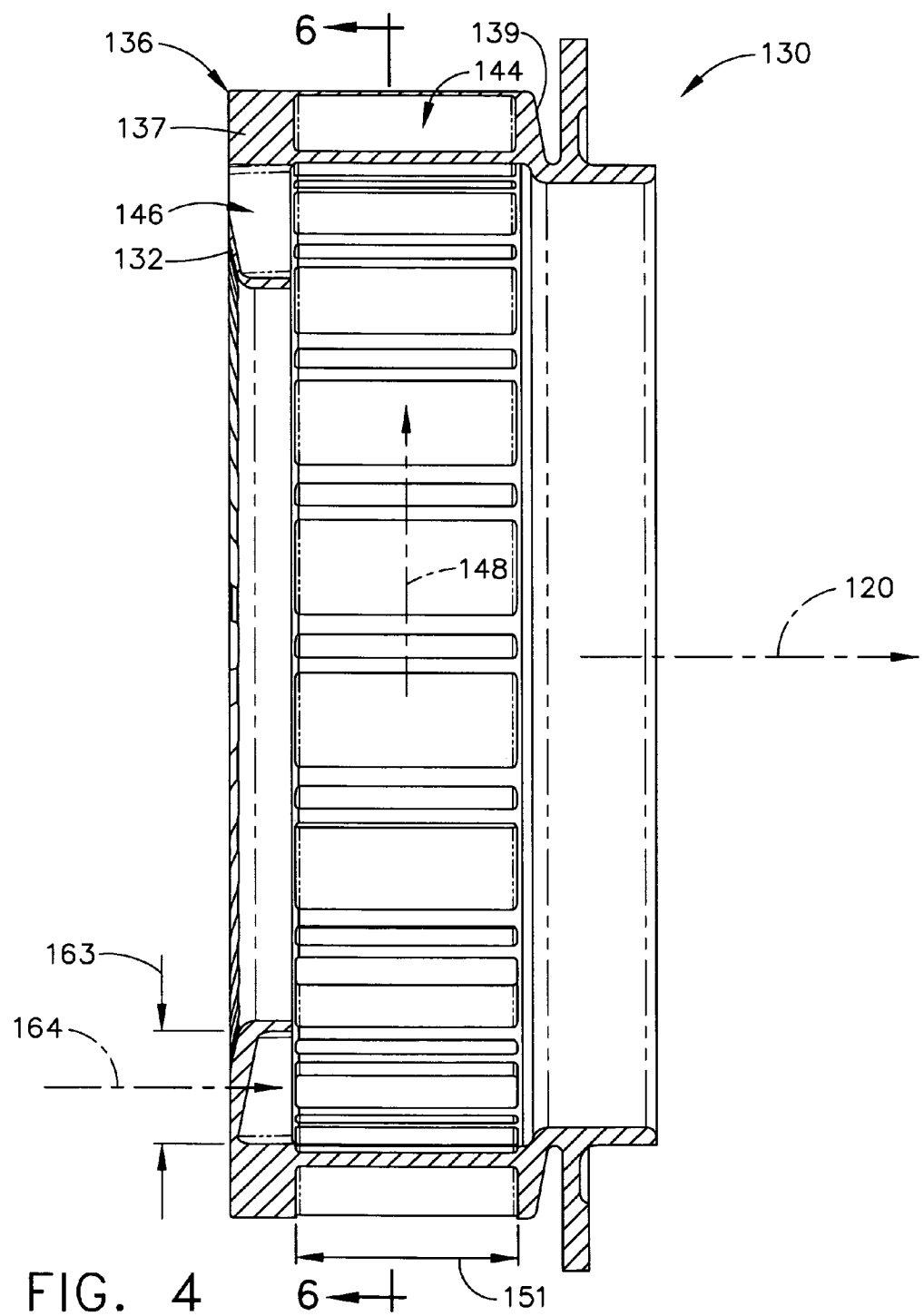
FIG. 4 is an enlarged, side view of a first embodiment for the swirler arrangement of the present invention, where one swirler is oriented substantially radially to a centerline axis through the mixer assembly and one swirler is oriented substantially parallel to the centerline axis.
Figure 5:
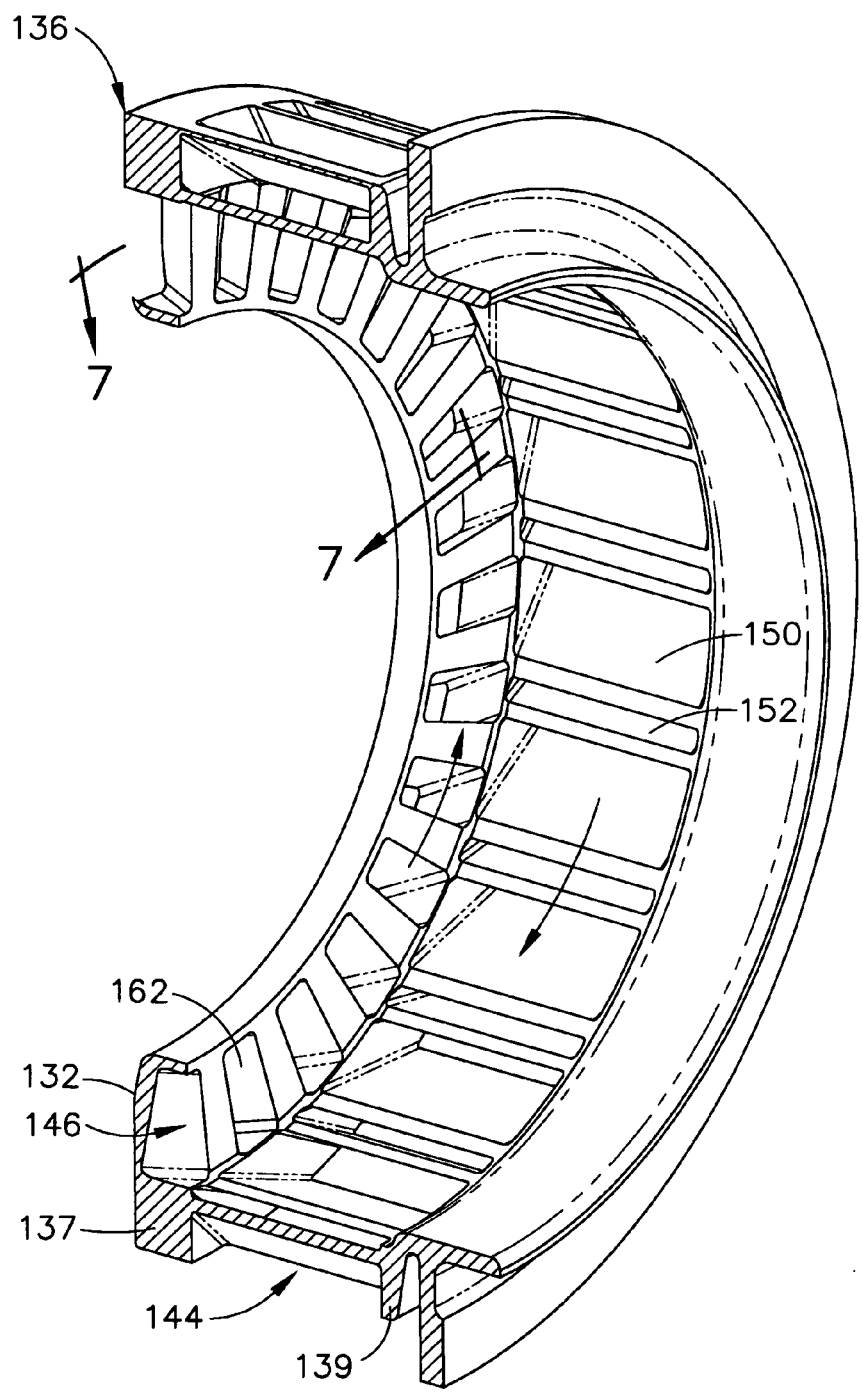
FIG. 5 is a partial perspective view of the swirler arrangement depicted in FIG. 4.

A mixing assembly 100 in accordance with one embodiment of the present invention is shown in FIG. 3. Mixing assembly 100 preferably includes a pilot mixer 102, a main mixer 104, and a fuel manifold 106 positioned therebetween. More specifically, it will be seen that pilot mixer 102 preferably includes an annular pilot housing 108 having a hollow interior, as well as a pilot fuel nozzle 110 mounted in housing 108 and adapted for dispensing droplets of fuel to the hollow interior of pilot housing 108. Further, pilot mixer preferably includes a first swirler 112 located at a radially inner position adjacent pilot fuel nozzle 110, a second swirler 114 located at a radially outer position from first swirler 112, and a splitter 116 positioned therebetween. Splitter 116 extends downstream of pilot fuel nozzle 110 to form a venturi 118 at a downstream portion. It will be understood that first and second pilot swirlers 112 and 114 are generally oriented parallel to a centerline axis 120 through mixing assembly 100 and include a plurality of vanes for swirling air traveling therethrough. Fuel and air are provided to pilot mixer 102 at all times during the engine operating cycle so that a primary combustion zone 122 is produced within a central portion of combustion chamber 62 (see FIG. 2).

Main mixer 104 further includes an annular main housing 124 radially surrounding pilot housing 108 and defining an annular cavity 126, a plurality of fuel injection ports 128 which introduce fuel into annular cavity 126, and a swirler arrangement identified generally by numeral 130. More specifically, annular cavity 126 is preferably defined by an upstream wall 132 and an outer radial wall 134 of a swirler housing 136, and by an inner radial wall 138 of a centerbody outer shell 140. It will be seen that inner radial wall 132 preferably also includes a ramp portion 142 located at a forward position along annular cavity 126. It will be appreciated that annular cavity 126 gently transitions from an upstream end 127 having a first radial height 129 to a downstream end 131 having a second radial height 133. The difference between first radial height 129 and second radial height 133 of annular cavity 126 is due primarily to outer radial wall 134 of swirler housing 136 incorporating a swirler 144 therein at upstream end 127. In addition, ramp portion 142 of inner radial wall 138 is preferably located within an axial length 145 of swirler 144.

It will be seen in FIGS. 3-7 that swirler arrangement 130 preferably includes first and second swirlers 144 and 146, respectively, positioned upstream from fuel injection ports 128. First swirler 144 is incorporated into outer radial wall 134 and has an axis 148 therethrough preferably oriented substantially radially to centerline axis 120 of mixer assembly 100. Second swirler 146 is preferably incorporated into upstream wall 132 and oriented substantially parallel to centerline axis 120 through mixer assembly 100. First and second swirlers 144 and 146 each have a plurality of vanes associated therewith for swirling air traveling through such swirler to mix air and droplets of fuel dispensed by fuel injection ports 128.

Figure 6:
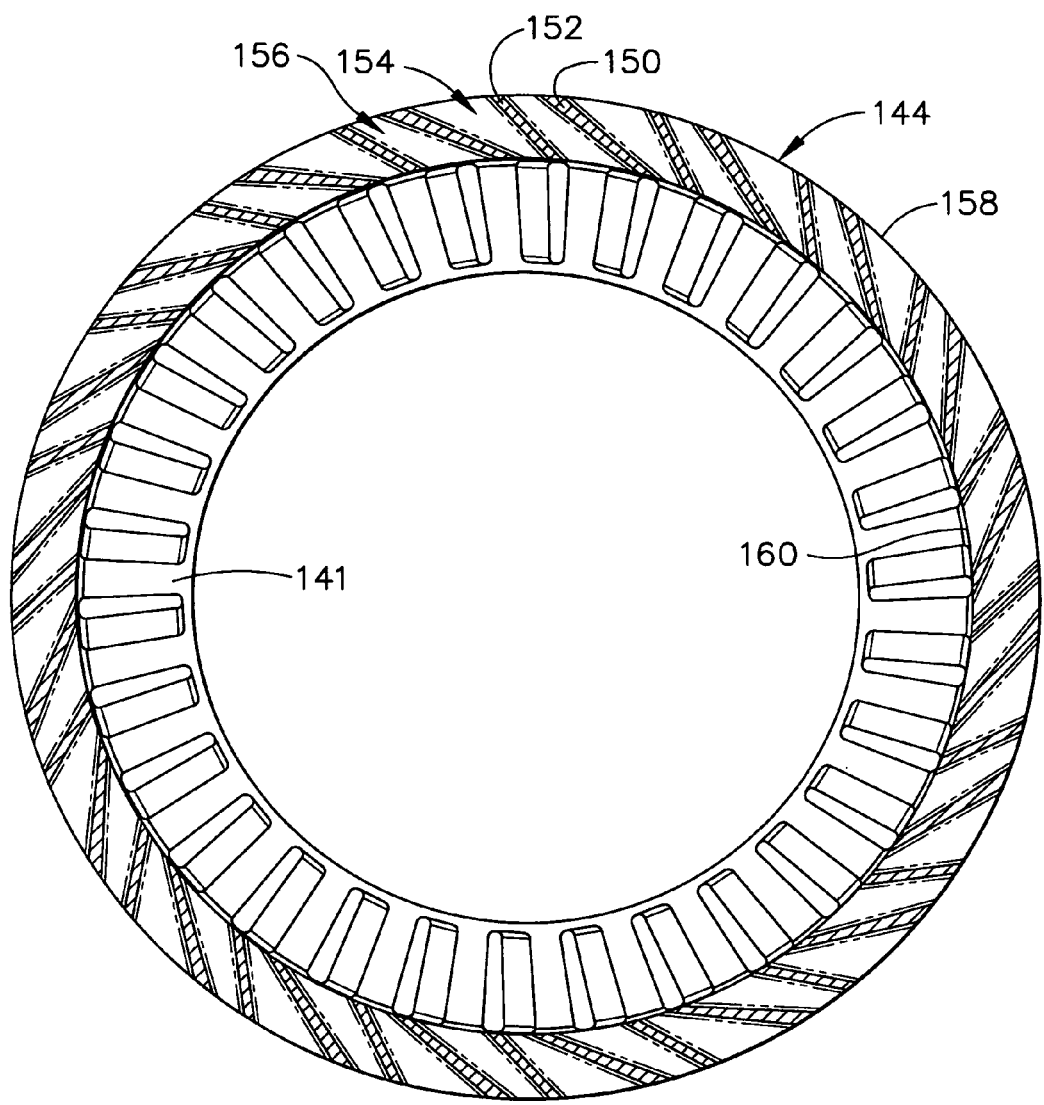
FIG. 6 is an aft view of the swirler arrangement depicted in FIGS. 4 and 5 taken along line 6-6 in FIG. 4, where the vanes in the radial swirler are arranged to define shaped passages therebetween.
Figure 7:
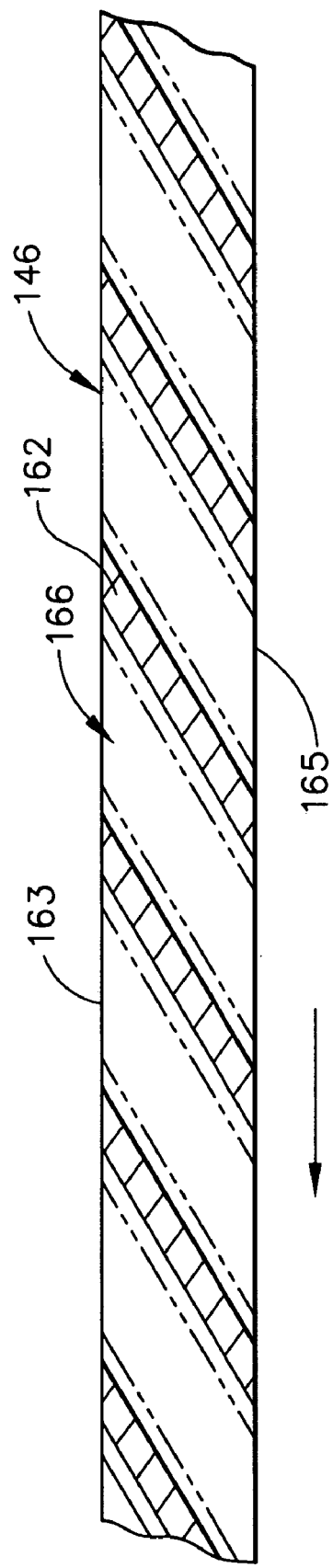
FIG. 7 is a view of the swirler arrangement depicted in FIGS. 4 and 5 taken along line 7-7 in FIG. 5, where the vanes in the axial swirler are arranged to define substantially uniform passages therebetween.
Figure 8:
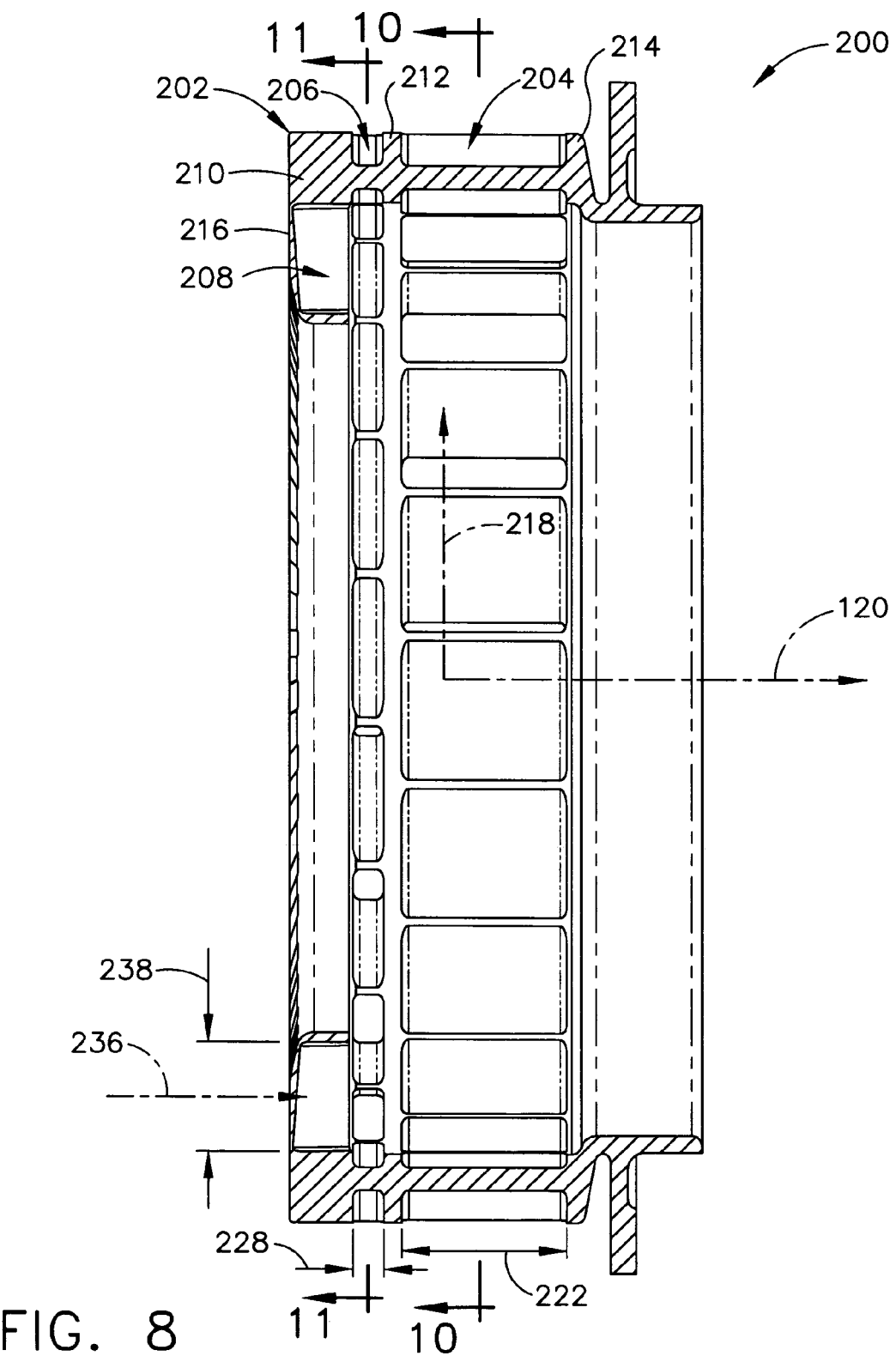
FIG. 8 is an enlarged, side view of a second embodiment for the swirler arrangement of the present invention, where two swirlers are oriented substantially perpendicular to a centerline axis through the mixer assembly and one swirler is oriented substantially parallel to the centerline axis.
Figure 9:
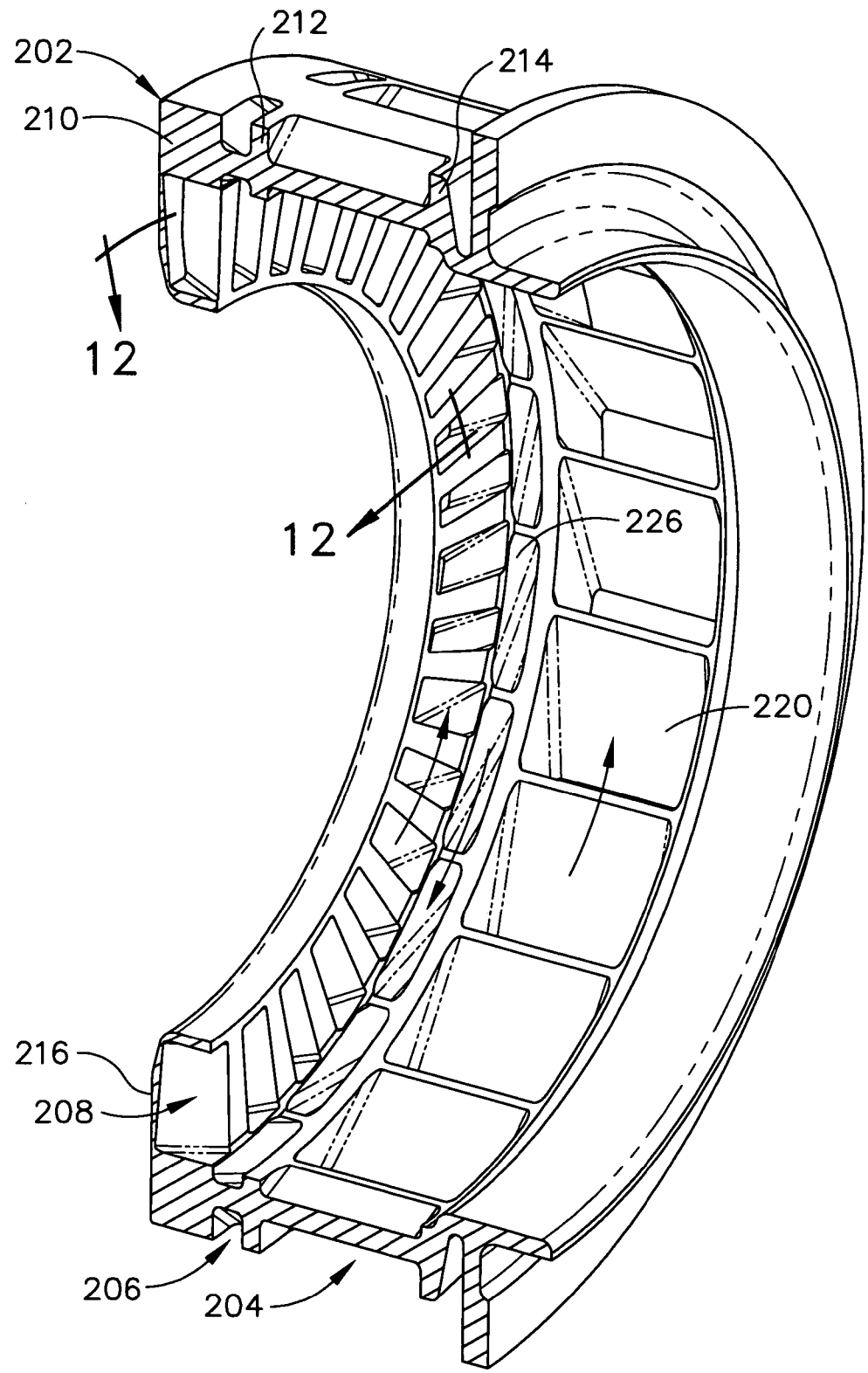
FIG. 9 is a partial perspective view of the swirler arrangement depicted in FIG. 8.
Figure 10:
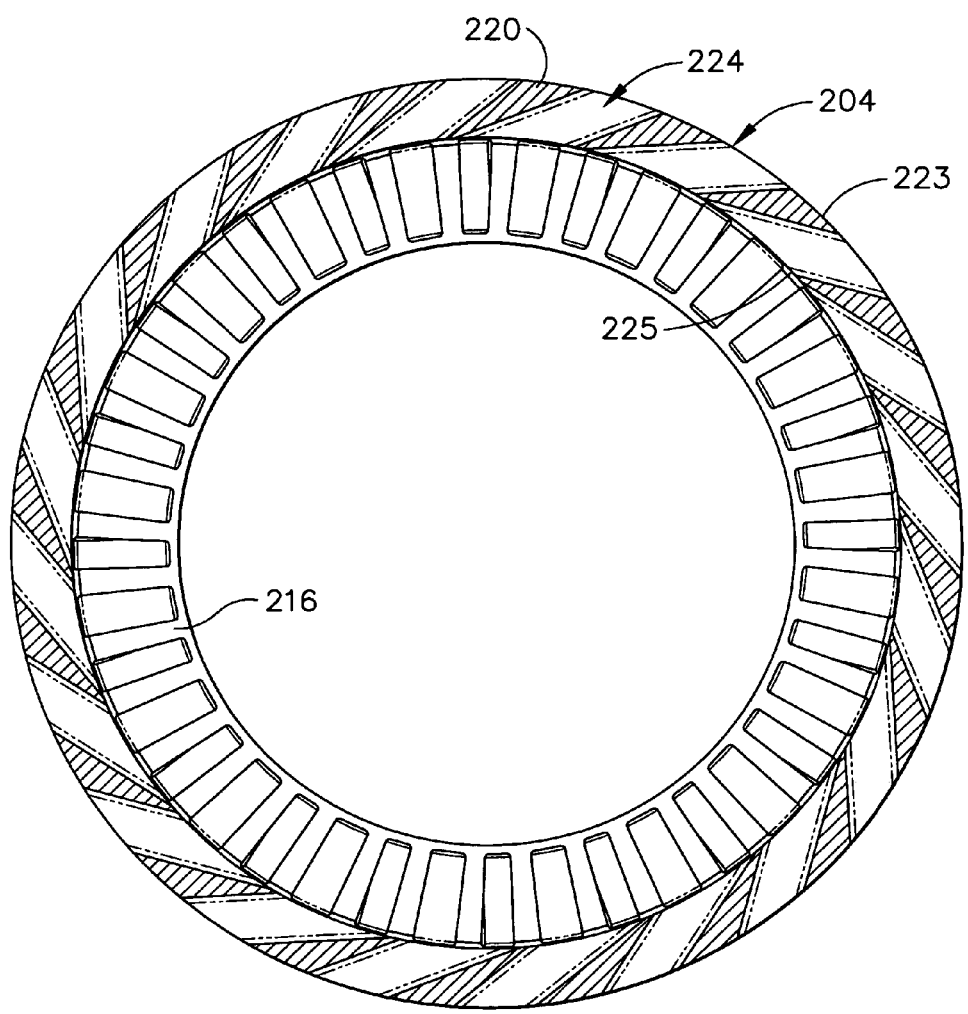
FIG. 10 is an aft view of the swirler arrangement depicted in FIGS. 8 and 9 taken along line 10-10 in FIG. 8, where the vanes in the downstream radial swirler are arranged to define substantially uniform passages therebetween.
Figure 11:
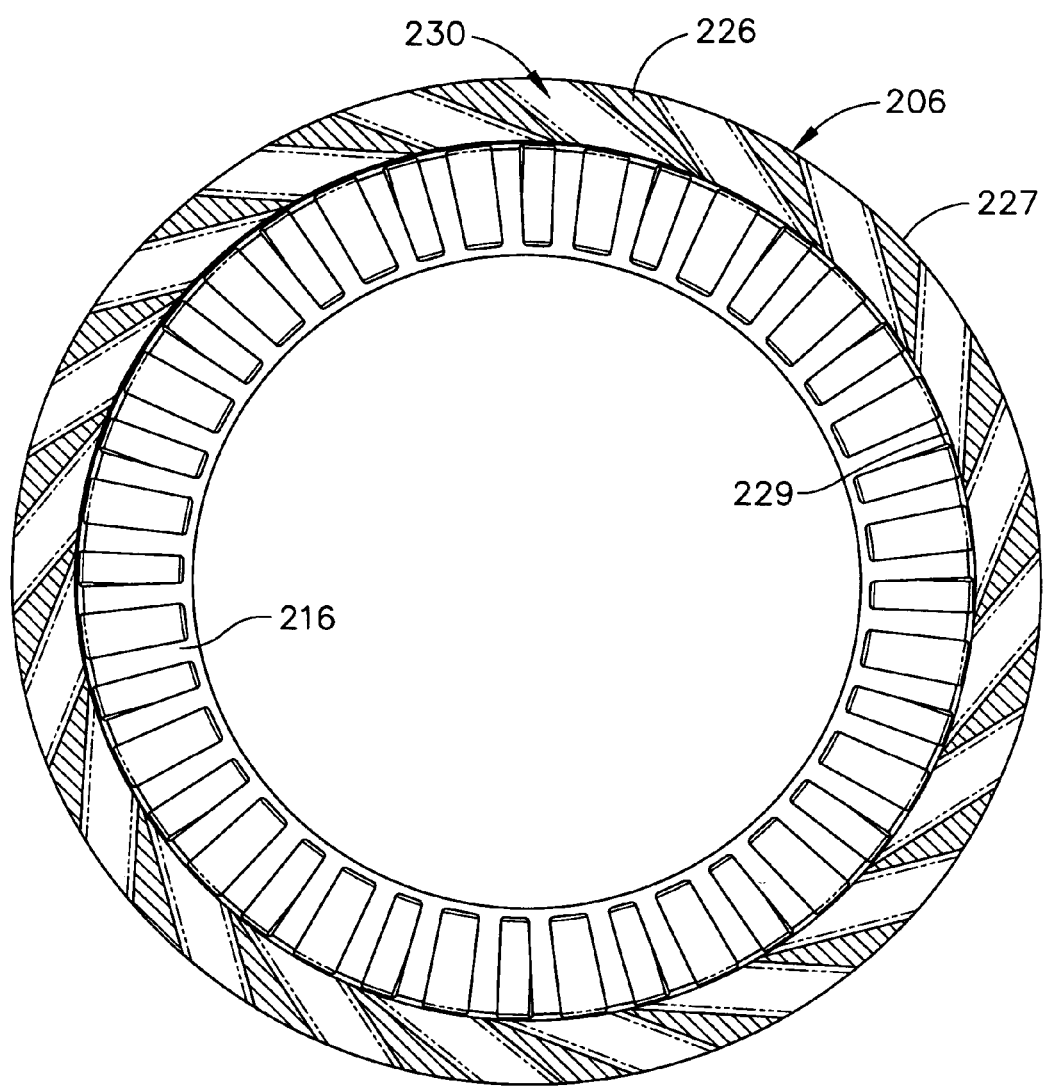
FIG. 11 is an aft view of the swirler arrangement depicted in FIGS. 8 and 9 taken along line 11-11 in FIG. 8, where the vanes in the upstream radial swirler are arranged to define substantially uniform passages therebetween.

In the first embodiment, it will be noted that first swirler 144 includes a first plurality of vanes 150 extending between first and second portions 137 and 139 of outer radial wall 134, as well as a second plurality of vanes 152 extending therebetween. It will be appreciated that first vanes 150 are preferably oriented at an angle of approximately 20-70° with respect to axis 148 and second vanes 152 are preferably oriented at an angle of approximately 20-70° with respect to axis 148. First and second vanes 150 and 152 will each have a length 151 which is measured across opposite ends (i.e., in the axial direction relative to centerline axis 120 of mixing assembly 100) that is equivalent to the spacing between first and second annular portions 137 and 139. Since first and second vanes 150 and 152 alternate circumferentially around swirler housing 136, a first type of passage 154 is defined between adjacent first and second vanes 150 and 152 on a first side having a first configuration and a second type of passage 156 is defined between first and second vanes 150 and 152 on a second side having a second configuration. As best seen in FIG. 6, first passage 154 is configured to converge from an upstream end 158 to a downstream end 160 of first swirler 144. Conversely, second passage 156 is configured to diverge from upstream end 158 to downstream end 160 of first swirler 144. It will be noted that first and second vanes 150 and 152 preferably extend from upstream end 158 of first swirler 144 to downstream end 160 thereof. Nevertheless, first and second vanes 150 and 152 may extend only part of the way from upstream end 158 to downstream end 160 so that the tips of first and second vanes 150 and 152 are stepped or lie on a different annulus.

This approach to configuring first and second vanes 150 and 152, and therefore first and second passages 154 and 156, encourages a momentum change in the air flowing through first swirler 144 to enhance the swirling effect. By creating passages in first swirler 144 having a non-uniform shape, swirler arrangement 130 may be tailored to provide a desired effect for the mixing of air and fuel within annular cavity 126. Such passages are also able to take into account the presence or absence of other swirlers in swirler arrangement 130, as well as the location of fuel injection ports 128. It will be understood that passages 154 and 156 may be altered in their degree of convergence and divergence by reconfiguring vanes 150 and 152.

Second swirler 146 is shown as including a plurality of vanes 162 incorporated into upstream wall 132, where vanes 162 are oriented at an angle of approximately 20-70° with respect to an axis 164 extending through upstream wall 132. Vanes 162 each have a length 163 which is measured across opposite ends (i.e., in the radial direction relative to centerline axis 120 of mixing assembly 100). Because vanes 162 are uniformly spaced circumferentially around flange 141, uniform passages 166 are defined between adjacent vanes (see FIG. 7). It will be noted that vanes 162 preferably extend from an inner radial end 165 of second swirler 146 to an outer radial end 167.

It will be understood that air flowing through first swirler 144 will be swirled in a first direction and air flowing through second swirler 146 will preferably be swirled in a direction opposite the first direction. In this way, an intense mixing region 168 of air and fuel is created within annular cavity 126 having an enhanced total kinetic energy. By properly configuring swirlers 144 and 146, intense mixing region 168 is substantially centered within annular cavity 126, positioned axially adjacent fuel injection ports 128 and has a designated area. The configuration of the vanes in swirlers 144 and 146 may be altered to vary the swirl direction of air flowing therethrough and not be limited to the exemplary swirl directions indicated hereinabove.

It will be seen that length 151 of first swirler vanes 150 and 152 is preferably greater than length 163 of second swirler vanes 162. Accordingly, a relatively greater amount of air flows through first swirler 144 than through second swirler 146 due to the greater passage area therefor. The relative lengths of swirlers 144 and 146 may be varied as desired to alter the distribution of air therethrough, so the sizes depicted are only illustrative.

Fuel manifold 106, as stated above, is located between pilot mixer 102 and main mixer 104 and is in flow communication with a fuel supply. In particular, outer radial wall 138 of centerbody outer shell 140 forms an outer radial surface 170 of fuel manifold 106, and a shroud member 172 is configured to provide an inner radial surface 174 and an aft surface 176 thereof. Fuel injection ports 128 are in flow communication with fuel manifold, preferably spaced circumferentially around centerbody outer shell 140, and configured as disclosed in a patent application entitled "Mixer Assembly For Combustor Of A Gas Turbine Engine Having A Main Mixer With Improved Fuel Penetration," filed concurrently herewith and also owned by the assignee of the present invention.

When fuel is provided to main mixer 104, an annular, secondary combustion zone 178 is provided in combustion chamber 62 that is radially outwardly spaced from and concentrically surrounds primary combustion zone 122. Depending upon the size of gas turbine engine 10, as many as twenty or so mixer assemblies 100 can be disposed in a circular array at inlet 64 of combustion chamber 62.

FIGS. 8-12 depict an alternative swirler arrangement 200 having a swirler housing 202 which includes first, second and third swirlers 204, 206 and 208, respectively, positioned upstream from fuel injection ports 128. More specifically, swirler housing 202 further includes an outer radial wall 210 and an upstream wall 212. First and second swirlers 204 and 206 are incorporated into outer wall 210 and preferably oriented substantially radially to centerline axis 120 through mixer assembly 200 and have an axis 218 therethrough. Third swirler 208 is preferably incorporated into upstream wall 212 and oriented substantially parallel to centerline axis 10 through mixer assembly 200. First, second and third swirlers 204, 206 and 208 each have a plurality of vanes associated therewith for swirling air traveling through such swirler to mix air and droplets of fuel dispensed by fuel injection ports 128.

In particular, it will be noted that first swirler 204 includes a plurality of vanes 220 extending between first and second portions 214 and 216 of outer wall 210. It will be appreciated that vanes 220 are oriented at an angle of approximately 20-70° with respect to axis 218. Vanes 220 each have a length 222 which is measured across opposite ends (i.e., in the axial direction perpendicular to axis 218). Because vanes 220 are uniformly spaced circumferentially around swirler housing 202, uniform passages 224 are defined between adjacent vanes (see FIG. 10). It will be noted that vanes 222 preferably extend from an upstream end 223 of first swirler 204 to a downstream end 225.

Similarly, second swirler 206 includes a plurality of vanes 226 extending between second and third portions 216 and 217 of outer wall 210. It will be appreciated that vanes 226 are oriented at an angle of approximately 0-60° with respect to axis 218. Vanes 226 each have a length 228 which is measured across opposite ends (i.e., in the axial direction perpendicular to axis 218). Because vanes 226 are uniformly spaced circumferentially around swirler housing 202, uniform passages 230 are defined between adjacent vanes (see FIG. 11). It will be noted that vanes 226 preferably extend from an upstream end 227 of second swirler 206 to a downstream end 229.

Figure 12:
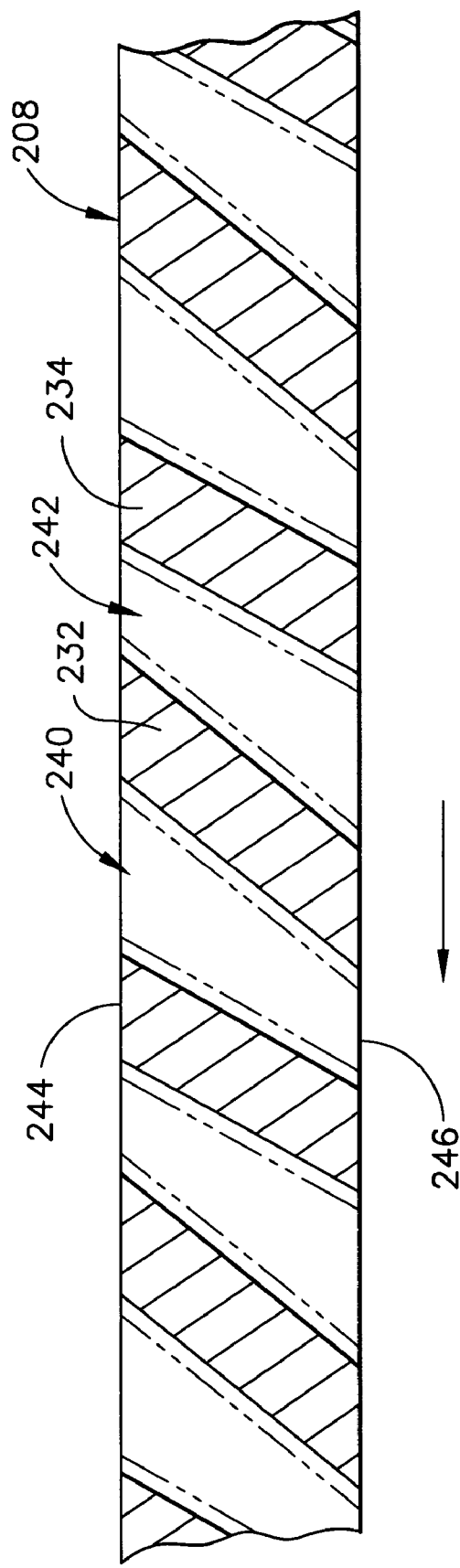
FIG. 12 is a view of the swirler arrangement depicted in FIGS. 8 and 9 taken along line 12-12 in FIG. 9, where the vanes in the axial swirler are arranged to define shaped passages therebetween.
Figure 13:
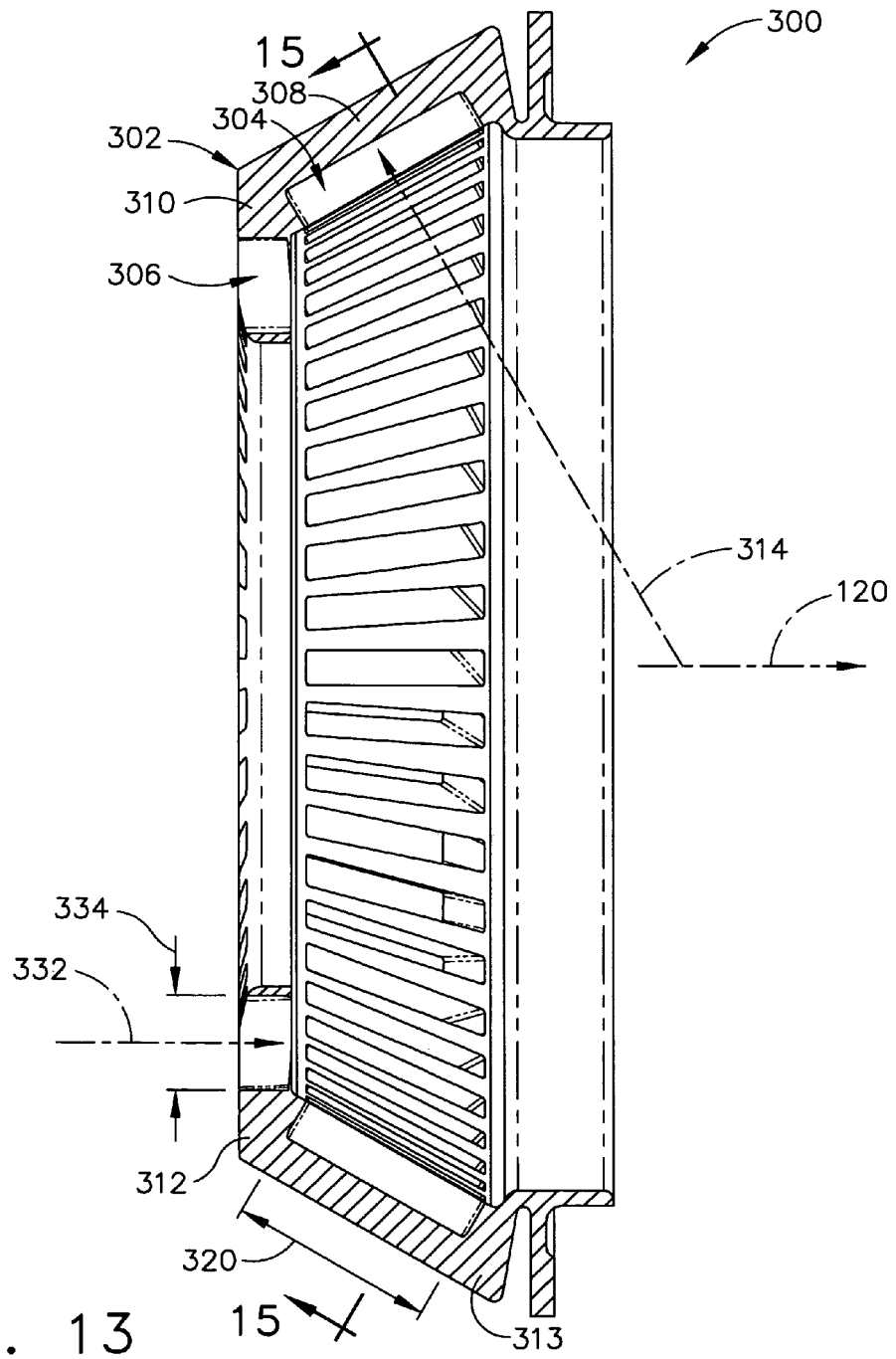
FIG. 13 is an enlarged, side view of a third embodiment for the swirler arrangement of the present invention, where one swirler is oriented at an acute angle to a centerline axis through the mixer assembly and one swirler is oriented substantially axially to the centerline axis.

In the second embodiment, it will be noted that third swirler 208 preferably includes a first plurality of vanes 232 incorporated into upstream wall 212, as well as a second plurality of vanes 234 incorporated therein. It will be appreciated that first vanes 232 are preferably oriented at an angle of approximately 20-70° with respect to an axis 236 through third swirler 208 and second vanes 234 are preferably oriented at an angle of approximately 20-70° with respect to axis 236. First and second vanes 232 and 234 will each have a length 238 which is measured across opposite ends (i.e., in the radial direction relative to axis 236). Since first and second vanes 232 and 234 alternate circumferentially around swirler housing 202, a first type of passage 240 is defined between adjacent first and second vanes 232 and 234 on a first side having a first configuration and a second type of passage 242 is defined between first and second vanes 232 and 234 on a second side having a second configuration. As best seen in FIG. 12, first passage 240 is configured to converge from an upstream end 244 to a downstream end 246 of third swirler 208. Conversely, second passage 242 is configured to diverge from upstream end 244 to downstream end 246 of third swirler 208. It will be noted that first and second vanes 232 and 234 preferably extend from upstream end 244 of first swirler 144 to downstream end 246 thereof. Nevertheless, first and second vanes 232 and 234 may extend only part of the way from upstream end 244 to downstream end 246 so that the tips of first and second vanes 232 and 234 are stepped or lie on a different annulus.

As explained herein, this approach to configuring first and second vanes 232 and 234, and therefore first and second passages 240 and 242, encourages a momentum change in the air flowing through third swirler 208 to enhance the swirling effect. By creating passages in third swirler 208 having a non-uniform shape, swirler arrangement 200 may be tailored to provide a desired effect for the mixing of air and fuel within annular cavity 126. Such passages are also able to take into account the presence or absence of other swirlers in swirler arrangement 200, as well as the location of fuel injection ports 128. It will be understood that passages 240 and 242 may be altered in their degree of convergence and divergence by reconfiguring vanes 232 and 234.

It will be understood that air flowing through first and third swirlers 204 and 208 will be swirled in a first direction and air flowing through second swirler 206 will preferably be swirled in a direction opposite the first direction. In this way, an intense mixing region 248 of air and fuel is created within annular cavity 126 having an enhanced total kinetic energy. By properly configuring swirlers 204, 206 and 208, intense mixing region 248 is substantially centered within annular cavity 126, positioned axially adjacent fuel injection ports 128 and has a designated area. The configuration of the vanes in swirlers 204, 206 and 208 may be altered to vary the swirl direction of air flowing therethrough and not be limited to the exemplary swirl directions indicated hereinabove.

It will be seen that length 223 of first swirler vanes 220 is preferably greater than length 228 of second swirler vanes 226 and length 238 of third swirler vanes 232 and 234. Accordingly, a relatively greater amount of air flows through first swirler 204 than second and third swirlers 206 and 208 due to the greater passage area therefor. Length 238 of third swirler vanes 232 and 234 is preferably greater than length 228 of second swirler vanes 226 so that a relatively greater amount of air flows through third swirler 208 than second swirler 206. The relative lengths of swirlers 204, 206 and 208 may be varied as desired to alter the distribution of air flowing therethrough, so the sizes depicted are only illustrative.

FIGS. 13-16 depict another alternative swirler arrangement 300 having a swirler housing 302 which includes first and second swirlers 304 and 306, respectively, positioned upstream from fuel injection ports 128. More specifically, swirler housing 302 further includes a conical wall 308 oriented at an acute angle to centerline axis 120 and an upstream wall 310. First swirler 304 is incorporated into conical wall 308 and has an axis 314 therethrough. Second swirler 306 is preferably incorporated into upstream wall 310 and oriented substantially parallel to centerline axis 120 through mixer assembly 300. First and second swirlers 304 and 306 each have a plurality of vanes associated therewith for swirling air traveling through such swirler to mix air and droplets of fuel dispensed by fuel injection ports 128.

Figure 14:
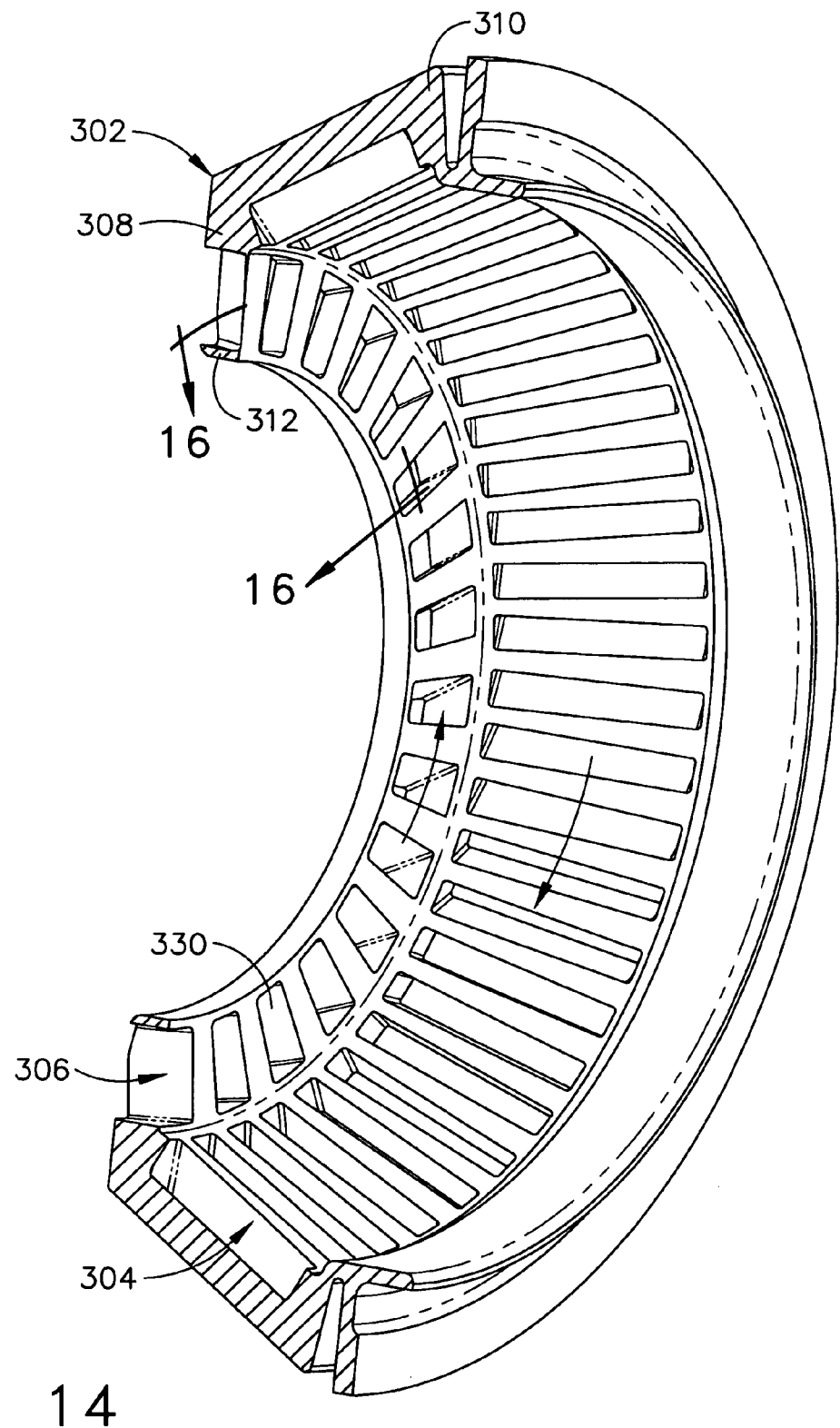
FIG. 14 is a partial perspective view of the swirler arrangement depicted in FIG. 13.
Figure 15:
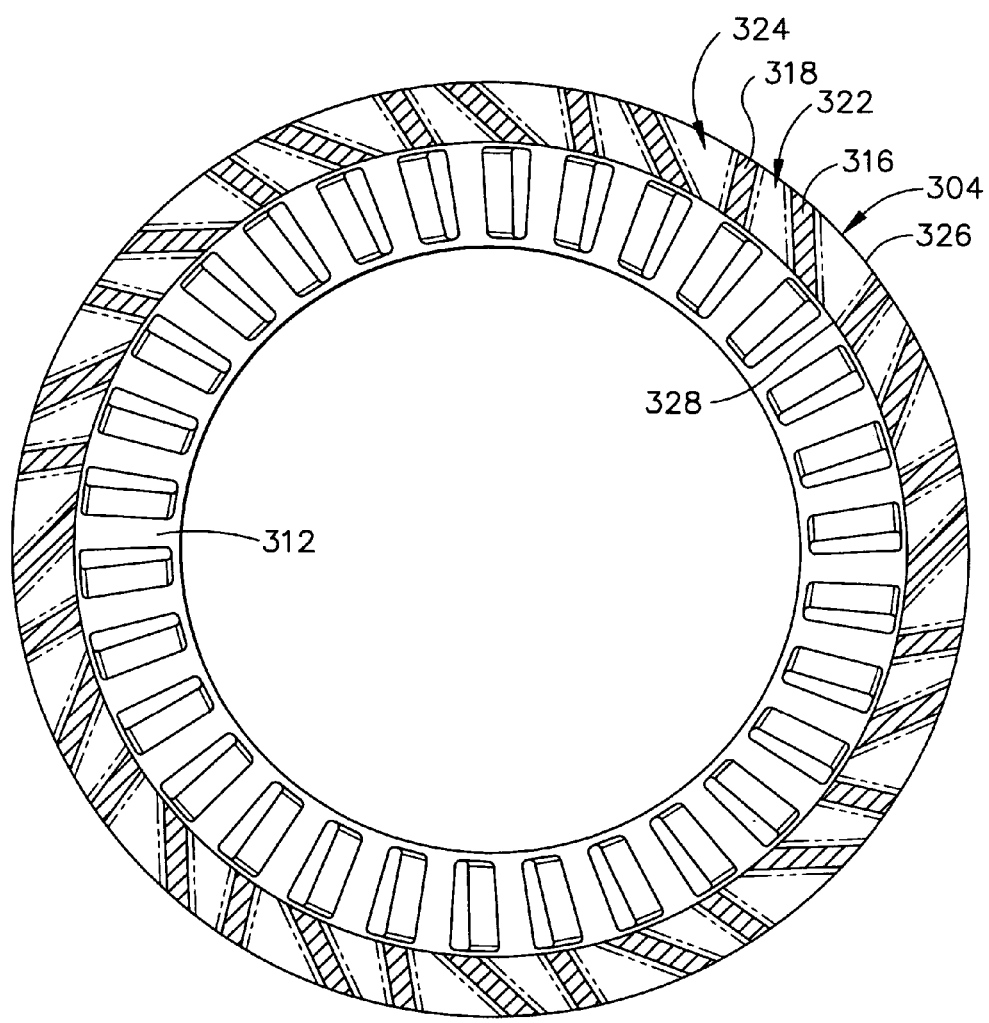
FIG. 15 is an aft view of the swirler arrangement depicted in FIGS. 13 and 14 taken along line 15-15 in FIG. 13, where the vanes in the conical swirler are arranged to define shaped passages therebetween.
Figure 16:
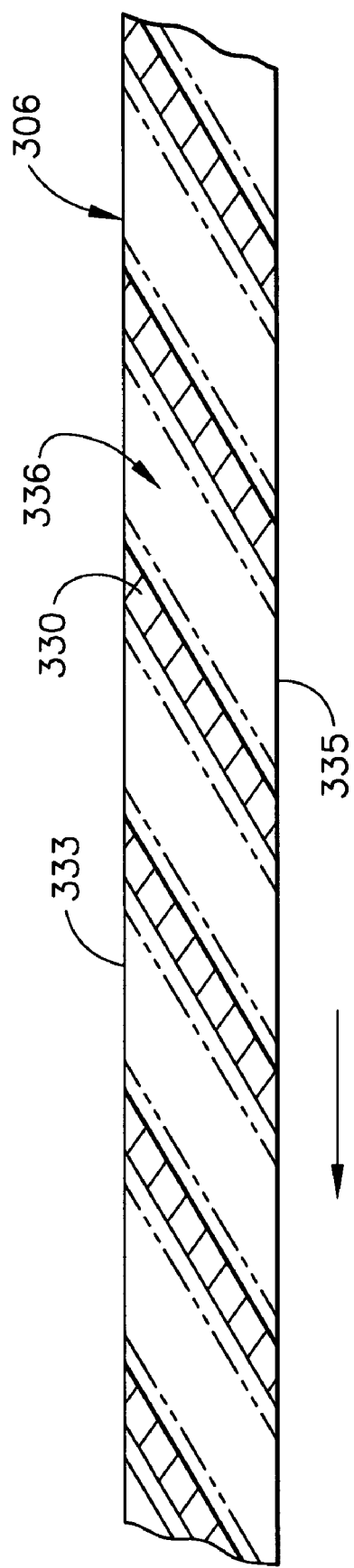
FIG. 16 is a view of the swirler arrangement depicted in FIGS. 13 and 14 taken along line 16-16 in FIG. 14.
Figure 17:
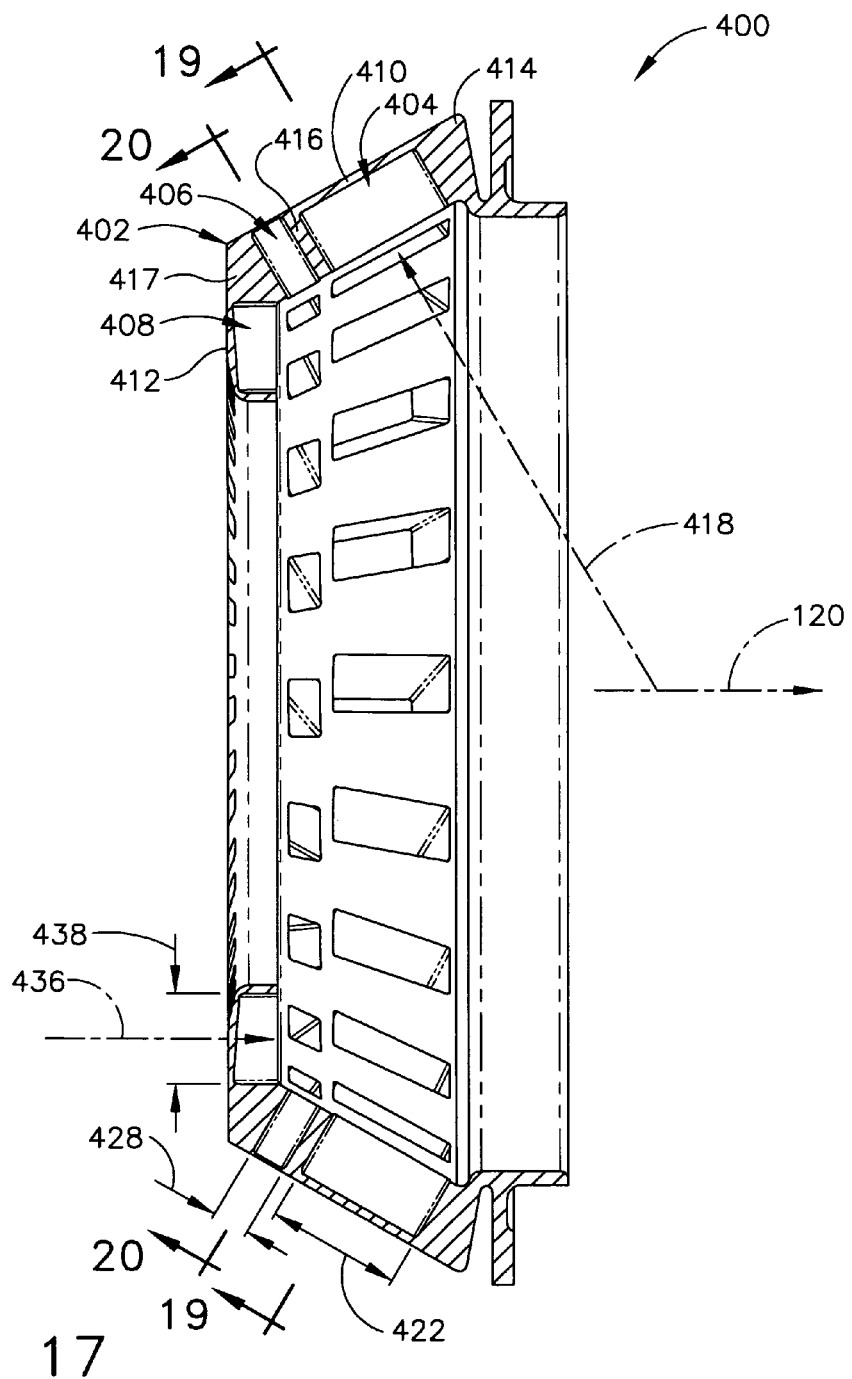
FIG. 17 is an enlarged, side view of a fourth embodiment for the swirler arrangement of the present invention, where two swirlers are oriented at an acute angle to a centerline axis through the mixer assembly and one swirler is oriented substantially axially to the centerline axis.
Figure 18:
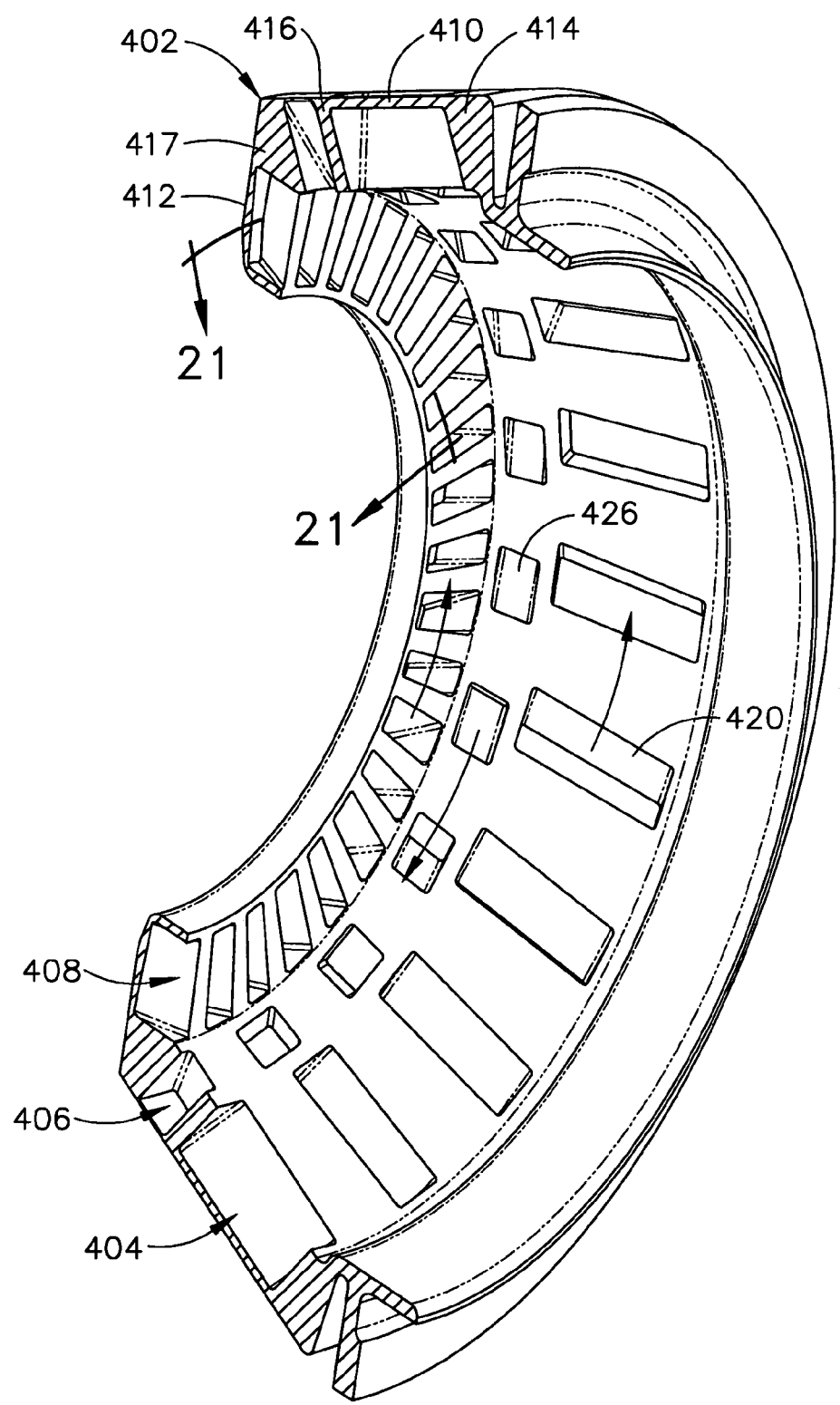
FIG. 18 is a partial perspective view of the swirler arrangement depicted in FIG. 17.
Figure 19:
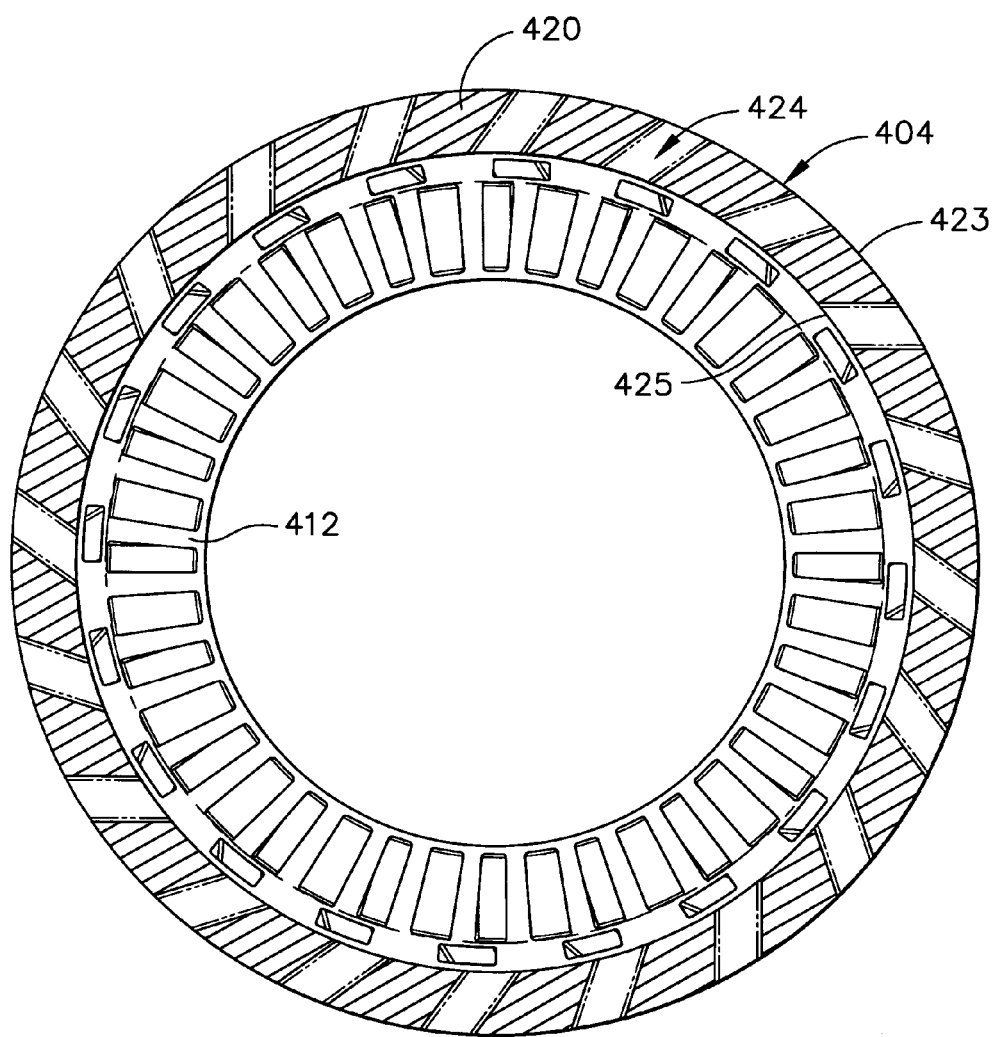
FIG. 19 is an aft view of the swirler arrangement depicted in FIGS. 17 and 18 taken along line 19-19 in FIG. 17, where the vanes in the downstream conical swirler are arranged to define substantially uniform passages therebetween.
Figure 20:
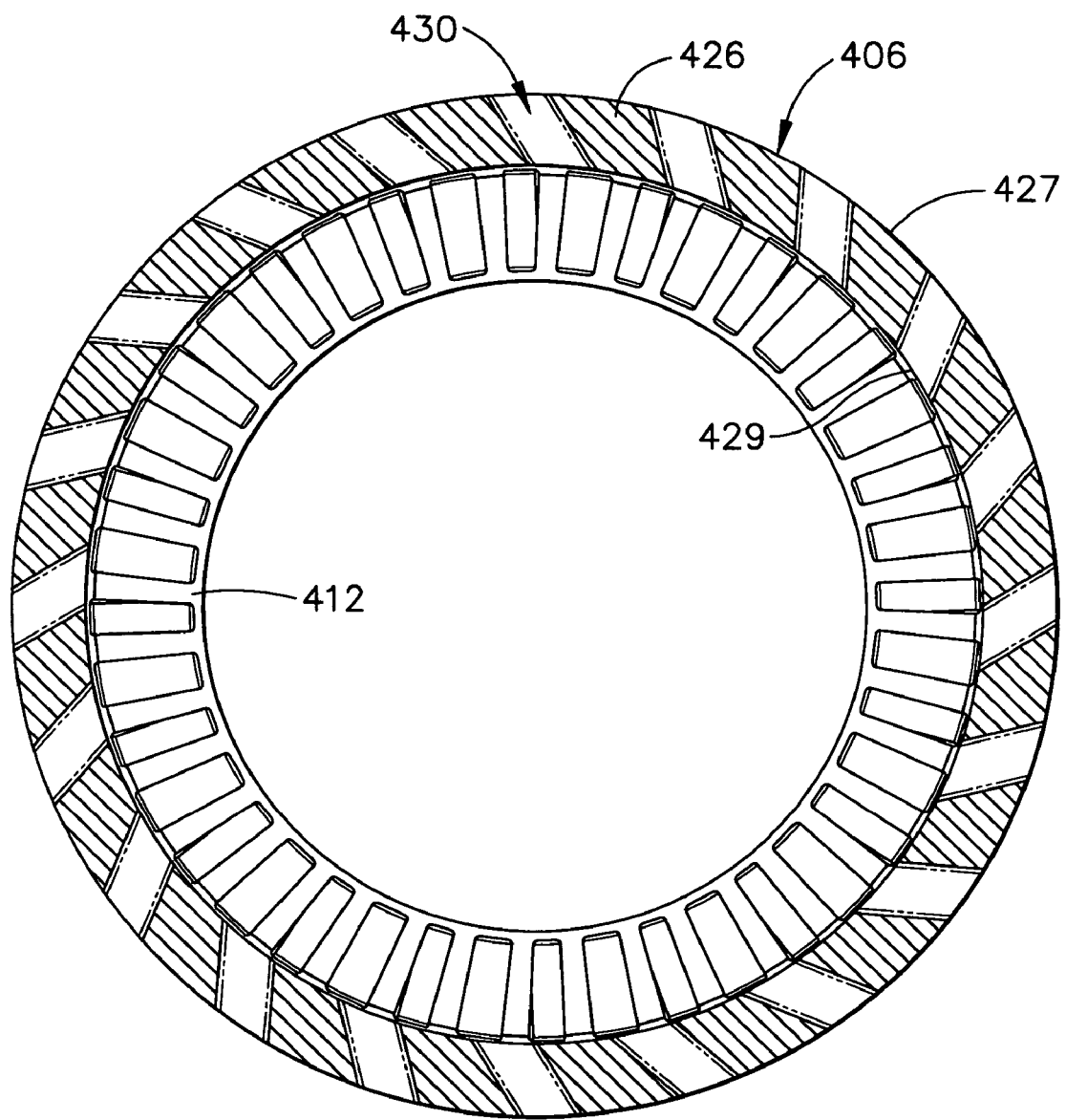
FIG. 20 is an aft view of the swirler arrangement depicted in FIGS. 17 and 18 taken along line 20-20 in FIG. 17, where the vanes in the upstream conical swirler are arranged to define substantially uniform passages therebetween.

It will be noted that first swirler 304 includes a first plurality of vanes 316 extending between first and second portions 312 and 313 of conical wall 308, as well as a second plurality of vanes 318 extending therebetween. It will be appreciated that first vanes 316 are preferably oriented at an angle of approximately 20-70° with respect to axis 314 and second vanes 318 are preferably oriented at an angle of approximately 20-70° with respect to axis 314. First and second vanes 316 and 318 will each have a length 320 which is measured across opposite ends (i.e., perpendicular to axis 314). Since first and second vanes 316 and 318 alternate circumferentially around swirler housing 302, a first type of passage 322 is defined between adjacent first and second vanes 316 and 318 on a first side having a first configuration and a second type of passage 324 is defined between first and second vanes 316 and 318 on a second side having a second configuration. As best seen in FIG. 14, first passage 322 is configured to converge from an upstream end 326 to a downstream end 328 of first swirler 304. Conversely, second passage 324 is configured to diverge from upstream end 326 to downstream end 328 of first swirler 304. It will be noted that first and second vanes 316 and 318 preferably extend from upstream end 326 of first swirler 304 to downstream end 328 thereof. Nevertheless, first and second vanes 316 and 318 may extend only part of the way from upstream end 326 to downstream end 328 so that the tips of first and second vanes 316 and 318 are stepped or lie on a different annulus.

This approach to configuring first and second vanes 316 and 318, and therefore first and second passages 322 and 324, encourages a momentum change in the air flowing through first swirler 304 to enhance the swirling effect. By creating passages in first swirler 304 having a non-uniform shape, swirler arrangement 300 may be tailored to provide a desired effect for the mixing of air and fuel within annular cavity 126. Such passages are also able to take into account the presence or absence of other swirlers in swirler arrangement 300, as well as the location of fuel injection ports 128. It will be understood that passages 322 and 324 may be altered in their degree of convergence and divergence by reconfiguring vanes 316 and 318.

Second swirler 306 is shown as including a plurality of vanes 330 incorporated into upstream wall 310, where vanes 330 are oriented at an angle of approximately 20-70° with respect to an axis 332 extending therethrough. Vanes 330 each have a length 334 which is measured across opposite ends (i.e., in the radial direction relative to centerline axis 120 of mixing assembly 300). Because vanes 330 are uniformly spaced circumferentially around upstream wall 310, uniform passages 336 are defined between adjacent vanes (see FIG. 16). It will be noted that vanes 330 extend from an upstream end 333 of second swirler 306 to a downstream end 335.

It will be understood that air flowing through first swirler 304 will be swirled in a first direction and air flowing through second swirler 306 will preferably be swirled in a direction opposite the first direction. In this way, an intense mixing region 338 of air and fuel is created within annular cavity 126 having an enhanced total kinetic energy. By properly configuring swirlers 304 and 306, intense mixing region 338 is substantially centered within annular cavity 126, positioned axially adjacent fuel injection ports 128 and has a designated area. The configuration of the vanes in swirlers 304 and 306 may be altered to vary the swirl direction of air flowing therethrough and not be limited to the exemplary swirl directions indicated hereinabove.

It will be seen that length 320 of first swirler vanes 316 and 318 is preferably greater than length 334 of second swirler vanes 330. Accordingly, a relatively greater amount of air flows through first swirler 304 than second swirler 306 due to the greater passage area therefor. The relative lengths of swirlers 304 and 306 may be varied as desired to alter the distribution of air flowing therethrough, so the sizes depicted are only illustrative.

FIGS. 17-21 depict a fourth swirler arrangement 400 having a swirler housing 402 which includes first, second and third swirlers 404, 406 and 408, respectively, positioned upstream from fuel injection ports 128. More specifically, swirler housing 402 further includes a conical wall 410 oriented at an acute angle to centerline axis 120 and an upstream wall 412. First swirler and second swirlers 404 and 406 are incorporated into conical wall 410 and have an axis 418 therethrough. Third swirler 408 is preferably incorporated into upstream wall 412 and oriented substantially parallel to centerline axis 120 through mixer assembly 400. First, second and third swirlers 404, 406 and 408 each have a plurality of vanes associated therewith for swirling air traveling through such swirler to mix air and droplets of fuel dispensed by fuel injection ports 128.

In particular, it will be noted that first swirler 404 includes a plurality of vanes 420 extending between first and second portions 414 and 416 of conical wall 410. It will be appreciated that vanes 420 are oriented at an angle of approximately 20-70° with respect to axis 418. Vanes 420 each have a length 422 which is measured across opposite ends (i.e., perpendicular to axis 418). Because vanes 420 are uniformly spaced circumferentially around swirler housing 402, uniform passages 424 are defined between adjacent vanes (see FIG. 19). It will be seen that vanes 420 extend from an upstream end 423 of first swirler 404 to a downstream end 425.

Similarly, second swirler 406 includes a plurality of vanes 426 extending between second and third portions 416 and 417 of conical wall 410. It will be appreciated that vanes 426 are oriented at an angle of approximately 0-70° with respect to axis 418. Vanes 426 each have a length 428 which is measured across opposite ends (i.e., in the axial direction perpendicular to axis 418). Because vanes 426 are uniformly spaced circumferentially around swirler housing 402, uniform passages 430 are defined between adjacent vanes (see FIG. 20). It will be seen that vanes 426 extend from an upstream end 427 of second swirler 406 to a downstream end. 429.

Figure 21:
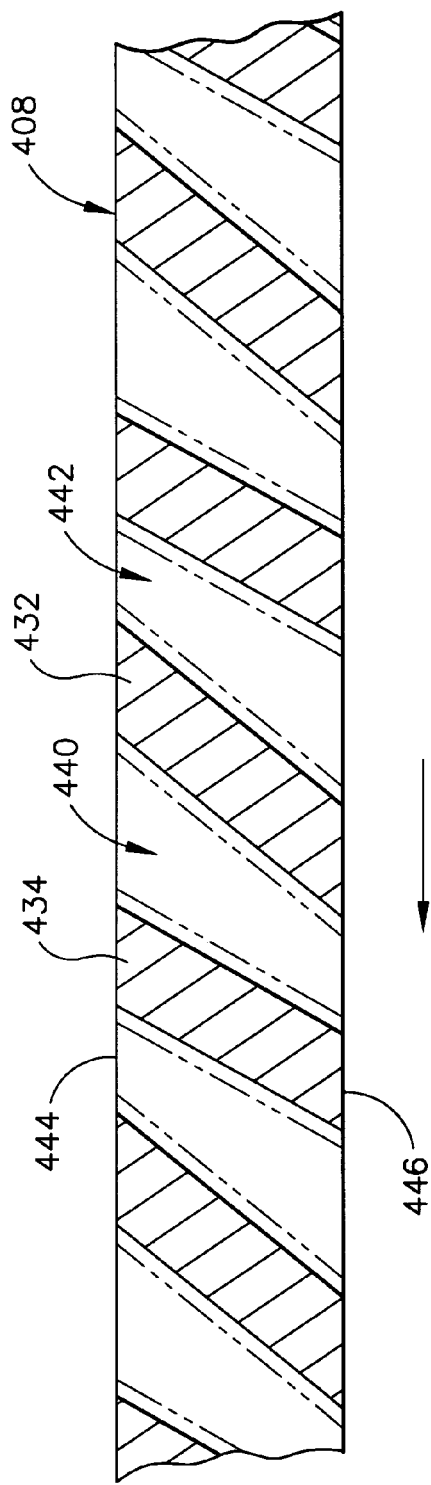
FIG. 21 is a view of the swirler arrangement depicted in FIGS. 17 and 18 taken along line 21-21 in FIG. 18, where the vanes in the axial swirler are arranged to define shaped passages therebetween.

It will be noted that third swirler 406 preferably includes a first plurality of vanes 432 incorporated into upstream wall 412, as well as a second plurality of vanes 434 incorporated therein. It will be appreciated that first vanes 432 are preferably oriented at an angle of approximately 0-70° with respect to an axis 436 through third swirler 408 and second vanes 434 are preferably oriented at an angle of approximately 0-70° with respect to axis 436. First and second vanes 432 and 434 will each have a length 438 which is measured across opposite ends (i.e., in the radial direction relative to axis 436). Since first and second vanes 432 and 434 alternate circumferentially around swirler housing 402, a first type of passage 440 is defined between adjacent first and second vanes 432 and 434 on a first side having a first configuration and a second type of passage 442 is defined between first and second vanes 432 and 434 on a second side having a second configuration. As best seen in FIG. 21, first passage 440 is configured to converge from an upstream end 444 to a downstream end 446 of third swirler 408. Conversely, second passage 442 is configured to diverge from upstream end 444 to downstream end 446 of third swirler 408. It will be noted that first and second vanes 432 and 434 preferably extend from upstream end 444 of third swirler 406 to downstream end 446 thereof. Nevertheless, first and second vanes 432 and 434 may extend only part of the way from upstream end 444 to downstream end 446 so that the tips of first and second vanes 432 and 434 are stepped or lie on a different annulus.

As explained herein, this approach to configuring first and second vanes 432 and 434, and therefore first and second passages 440 and 442, encourages a momentum change in the air flowing through third swirler 408 to enhance the swirling effect. By creating passages in third swirler 408 having a non-uniform shape, swirler arrangement 400 may be tailored to provide a desired effect for the mixing of air and fuel within annular cavity 126. Such passages are also able to take into account the presence or absence of other swirlers in swirler arrangement 400, as well as the location of fuel injection ports 128. It will be understood that passages 440 and 442 may be altered in their degree of convergence and divergence by reconfiguring vanes 432 and 434.

It will be understood that air flowing through first and third swirlers 404 and 408 will be swirled in a first direction and air flowing through second swirler 406 will preferably be swirled in a direction opposite the first direction. In this way, an intense mixing region 448 of air and fuel is created within annular cavity 126 having an enhanced total kinetic energy. By properly configuring swirlers 404, 406 and 408, intense mixing region 448 is substantially centered within annular cavity 126, positioned axially adjacent fuel injection ports 128 and has a designated area. The configuration of the vanes in swirlers 404, 406 and 408 may be altered to vary the swirl direction of air flowing therethrough and not be limited to the exemplary swirl directions indicated hereinabove.

It will be seen that length 422 of first swirler vanes 420 is preferably greater than length 428 of second swirler vanes 426 and length 438 of third swirler vanes 432 and 434. Accordingly, a relatively greater amount of air flows through first swirler 404 than second and third swirlers 406 and 408 due to the greater passage area therefor. Length 438 of third swirler vanes 432 and 434 is preferably greater than length 428 of second swirler vanes 426 so that a relatively greater amount of air flows through third swirler 408 than second swirler 406. The relative lengths of swirlers 404, 406 and 408 may be varied as desired to alter the distribution of air flowing therethrough, so the sizes depicted are only illustrative.

Figure 22:
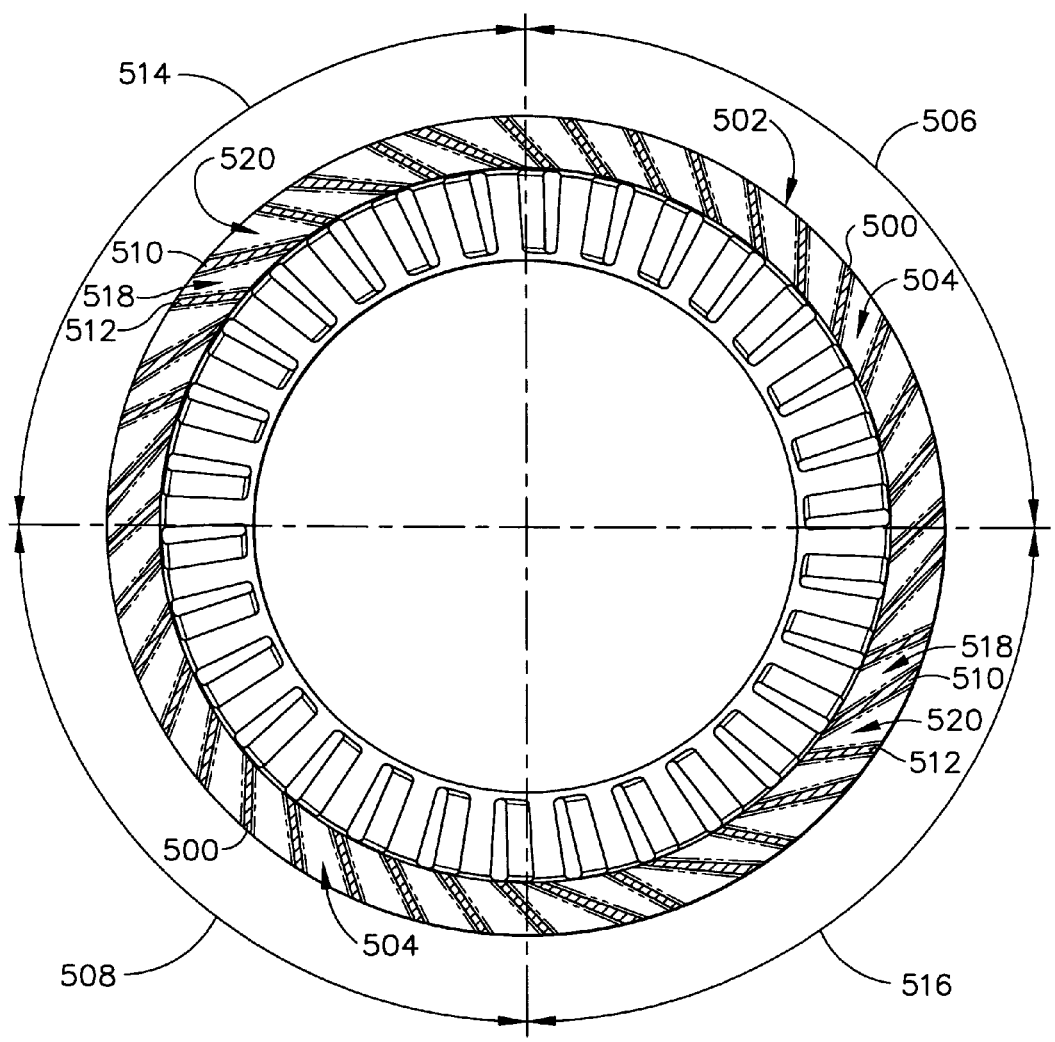
FIG. 22 is an aft view of the swirler arrangements depicted in FIGS. 4 or 13 similar to FIGS. 6 and 15, where the vanes in the radial or conical swirler are arranged to define separate quadrants with substantially uniform and shaped passages therebetween; and, FIG. 23 is a view of the swirler arrangements similar to that depicted in FIGS. 7, 12, 16 and 21, where the vanes in the axial swirler are arranged to define substantially uniform passages between some vanes and shaped passages between other vanes.

As seen in FIG. 22, vanes 500 of a radial or conical swirler 502 may be configured so that uniform passages 504 are defined between adjacent vanes in certain portions (or quadrants) 506 and 508 of such swirler. At the same time, a first plurality of vanes 510 and a second plurality of vanes 512 in other quadrants 514 and 516 of swirler 502 preferably have different configurations so that first and second shaped passages 518 and 520 are defined between adjacent vanes. In this way, swirler 502 may be further tailored to provide desirable characteristics to the intense mixing region within annular cavity 126.

Figure 23:
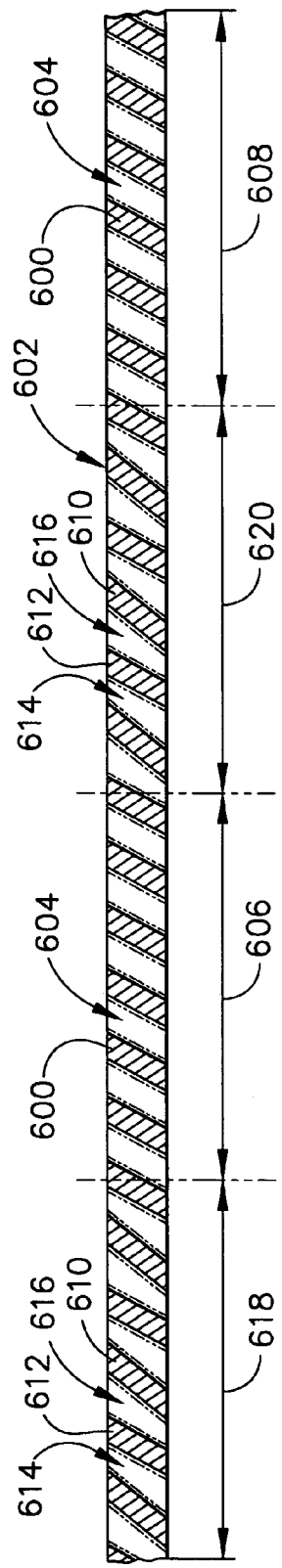

Similarly, FIG. 23 depicts vanes 600 of an axial swirler 602 which are configured to provide uniform passages 604 therebetween along portions 606 and 608 of swirler 602. A first plurality of vanes 610 and a second plurality of vanes 612 are preferably configured to provide first and second shaped passages 614 and 616 between vanes 610 and 612 in portions 618 and 620. In this way, swirler 602 may be further tailored to provide desirable mixing characteristics within annular cavity 126.

Although particular embodiments of the present invention have been illustrated and described, it will be apparent to those skilled in the art that various changes and modifications can be made without departing from the spirit of the present invention. Accordingly, it is intended to encompass within the appended claims all such changes and modification that fall within the scope of the present invention.

What is claimed is:

1. A swirler arrangement for a mixing assembly of a gas turbine engine combustor, said swirler arrangement having a centerline axis therethrough, comprising:
    (a) a swirler housing including an outer radial wall and an upstream wall;
    (b) a first plurality of vanes incorperated into said outer radial wall, wherein said first plurality of vanes are oriented at a first angle with respect to an axis through said outer radial wall; and,
    (c) a second plurality of vanes incorporated into said outer radial wall, wherein said second plurality of vanes are oriented at a second angle with respect to said axis through said outer radial wall different from said first angle;
wherein a first type of passage is defined between adjacent first and second vanes having a first configuration converging from an upstream end to a downstream end and a second type of passage is defined between adjacent first and second vanes having a second configuration diverging from an upstream end to a downstream end so that air flowing through said swirler arrangement is swirled in a desirable manner.

2. The swirler arrangement of claim 1, wherein each of said first plurality of vanes is oriented at a angle of approximately 20-70° with respect to said axis.

3. The swirler arrangement of claim 1, wherein each of said second plurality of vanes is oriental at an angle of approximately 20-70° with respect to said axis.

4. The swirler arrangement of claim 1, wherein said first and second types of passages have a non-uniform width from an upstream end to a downstream end.

5. The swirler arrangement of claim 1, wherein said first plurality of vanes and said second plurality of vanes alternate circumferentially around said swirler housing.

6. The swirler arrangement of claim 1, wherein said first and second plurality of vanes alternate circumferentially around at least a portion of said swirler housing.

7. The swirler arrangement of claim 6, further comprising a third plurality of vanes incorporated into said outer radial wall and oriented at a third angle with respect to said axis, wherein a third type of passage is defined between adjacent vanes having a third configuration.

8. The swirler arrangement of claim 7, wherein said third passages have a substantially constant width from an upstream end to a downstream end.

9. The swirler arrangement of claim 1, wherein said axis through said outer radial wall is oriented substantially radially to said centerline axis.

10. The swirler arrangement of claim 1, wherein said axis through said outer radial wall is oriented at an acute angle to said centerline axis.

11. The swirler arrangement of claim 1, further comprising a plurality of vanes incorporated in said upstream wall of said swirler housing.

12. The swirler arrangement of claim 11, wherein an axis through said upstream wall is oriented substantially parallel to said centerline axis.

13. The swirler arrangement of claim 12, further comprising:
    (a) a first plurality of vanes incorporated into said upstream wall, wherein said first plurality of vanes are oriented at a first angle with respect to said axis through said upstream wall; and,
    (b) a second plurality of vanes incorporated into said upstream wall, wherein said second plurality of vanes are oriented at a second angle with respect to said axis through said upstream wall;
wherein a first type of passage is defined between adjacent first and second vanes of said upstream wall having a first configuration and a second type of passage is defined between adjacent first and second vanes of said upstream wall having a second configuration so that air flowing through said swirler arrangement is swirled in a desirable manner.

14. The swirler arrangement of claim 13, wherein each of said first plurality of vanes incorporated into said upstream wall is oriented at an angle of approximately 20-70° with respect to said axis through said upstream wall.

15. The swirler arrangement of claim 13, wherein each of said second plurality of vanes incorporated into said upstream wall is oriented at an angle of approximately 20-70° with respect to said axis through said upstream wall.

16. The swirler arrangement of claim 13, wherein said first and second types of passages have a non-uniform width from an upstream end to a downstream end of said upstream wall.

17. The swirler arrangement of claim 13, wherein said first type of passage converges from an upstream end to a downstream end of said upstream wall.

18. The swirler arrangement of claim 13, wherein said second type of passage diverges from an upstream end to a downstream end of said upstream wall.

19. The swirler arrangement of claim 13, wherein said first plurality of vanes and said second plurality of vanes incorporated into said upstream wall alternate circumferentially therearound.

20. The swirler arrangement of claim 13, wherein said first and second plurality of vanes alternate circumferentially around at least part of said upstream wall.

21. The swirler arrangement of claim 20, further comprising a third plurality of vanes incorporated into said upstream wall oriented at a third angle with respect to said axis through said upstream wall, wherein a third type of passage is defined between adjacent vanes having a third configuration.

22. The swirler arrangement of claim 21, wherein said third passages have a substantially constant width from an upstream end to a downstream end of said upstream wall.

23. The swirler arrangement of claim 11, said plurality of vanes incorporated into said upstream wall being configured so that substantially uniform passages are defined between adjacent vanes.

24. The swirler arrangement of claim 1, said first and second plurality of vases being incorporated into said outer radial wall of said swirler housing being positioned within a first specified plane through said outer radial wall.

25. The swirler arrangement of claim 24, further comprising a third plurality of vanes being incorporated into said outer radial wall, wherein said third plurality of vanes are positioned within a second specified plane through said outer radial wall and oriented at a first angle with respect to said axis through said outer radial wall.

26. The swirler arrangement of claim 25, wherein substantially uniform passages are defined between adjacent vanes of said third plurality of vanes.

27. The swirler arrangement of claim 24, further comprising:
(a) a third plurality of vanes being incorporated into said outer radial wall, wherein said third plurality of vanes are positioned within a second specified plane through said outer radial wall and oriented at a first angle with respect to said axis through said outer radial wall; and,
(b) a fourth plurality of vanes being incorporated into said outer radial wall, wherein said fourth plurality of vanes are positioned within said second specified plane through said outer radial wall and oriented at a second angle with respect to said axis through said outer radial wall;

wherein a first type of passage is defined between adjacent third and fourth vanes having a first configuration and a second type of passage is defined between adjacent third and fourth vanes having a second configuration so that air flowing through said swirler arrangement is swirled in a desirable manner.

* * * * *